United States Patent
Larson et al.

(10) Patent No.: US 8,228,358 B2
(45) Date of Patent: Jul. 24, 2012

(54) DISTRIBUTED APERTURE HEAD-UP DISPLAY

(75) Inventors: Brent D. Larson, Cave Creek, AZ (US); Elias S. Haim, Glendale, AZ (US); Matthew B. Dubin, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 937 days.

(21) Appl. No.: 11/303,290

(22) Filed: Dec. 16, 2005

(65) Prior Publication Data
US 2006/0139503 A1 Jun. 29, 2006

Related U.S. Application Data

(60) Provisional application No. 60/639,876, filed on Dec. 29, 2004.

(51) Int. Cl.
*G09G 5/02* (2006.01)
(52) U.S. Cl. .............. 345/698; 345/695; 345/89
(58) Field of Classification Search .............. 345/698, 345/695, 89
See application file for complete search history.

(56) References Cited

U.S. PATENT DOCUMENTS

| | | | | |
|---|---|---|---|---|
| 4,812,017 A * | 3/1989 | Piper | | 349/144 |
| 4,869,575 A * | 9/1989 | Kubik | | 345/8 |
| 5,132,820 A | 7/1992 | Someya et al. | | |
| 5,313,726 A * | 5/1994 | Yaniv et al. | | 40/361 |
| 5,805,136 A * | 9/1998 | Silverbrook et al. | | 345/695 |
| 6,219,186 B1 * | 4/2001 | Hebert | | 359/618 |
| 6,654,449 B1 * | 11/2003 | Greene et al. | | 349/67 |
| 6,882,479 B2 * | 4/2005 | Song et al. | | 359/630 |
| 7,016,005 B2 * | 3/2006 | Koike | | 349/144 |
| 2002/0135738 A1 * | 9/2002 | Cok et al. | | 353/7 |
| 2003/0025995 A1 * | 2/2003 | Redert et al. | | 359/464 |
| 2003/0128225 A1 | 7/2003 | Credelle et al. | | |
| 2003/0132895 A1 | 7/2003 | Berstis | | |
| 2003/0227429 A1 * | 12/2003 | Shimoshikiryo | | 345/90 |

(Continued)

FOREIGN PATENT DOCUMENTS

EP 0381428 8/1990

(Continued)

OTHER PUBLICATIONS

PCT International Search Report PCT/US2005/046072, Jun. 2, 2006.

(Continued)

*Primary Examiner* — William Boddie
*Assistant Examiner* — Leonid Shapiro
(74) *Attorney, Agent, or Firm* — Ingrassia Fisher & Lorenz, P.C.

(57) ABSTRACT

Method and apparatus are provided for displaying an image to a viewer with reduced visual artifacts. The apparatus comprises a display panel for forming the image using an array of pixels with distributed active regions, and a viewing arrangement optically situated between the display panel and the viewer for transferring the image formed on the display panel to the viewer with limited angular pixel subtense. The distributed active regions of the pixels are desirably divided into at least two simultaneously switched portions at least partly separated by or surrounding a significant portion of the non-switchable region. First order spatial harmonics and associated artifacts are reduced by the distributed apertures and second order and higher harmonics are reduced by limiting the pixel subtense angle seen by the viewer. A significant reduction in visual artifacts arising from the periodic structure of the display panel is obtained.

20 Claims, 13 Drawing Sheets

U.S. PATENT DOCUMENTS

| | | | |
|---|---|---|---|
| 2004/0155652 | A1 | 8/2004 | Sodickson |
| 2006/0138322 | A1* | 6/2006 | Costello et al. ............... 250/305 |

FOREIGN PATENT DOCUMENTS

| | | |
|---|---|---|
| EP | 0 671 649 A2 | 9/1995 |
| JP | 63-282717 | 11/1988 |
| JP | 63282717 | 11/1988 |
| JP | 63-316087 | 12/1988 |
| JP | 03-024524 | 2/1991 |
| JP | 07-104318 | 4/1995 |
| JP | 2000-002585 A | 1/2000 |
| JP | 2000-203389 | 7/2000 |
| JP | 2001-072327 | 3/2001 |
| JP | 2002-229046 | 8/2002 |
| JP | 2004326139 | 11/2004 |
| KR | 20040014905 | 2/2004 |

OTHER PUBLICATIONS

PCT Search Report dated Apr. 20, 2006, PCT/US2005/046443.

Larson, B.; Distributed Aperture Display; Final Office Action for U.S. Appl. No. 11/303,135, Notification Date Apr. 14, 2010.

Larson, B.; Distributed Aperture Display; Notice of Appeal, Pre-Appeal Brief Request for Review, and Arguments Accompanying Pre-Appeal Brief Request for Review for U.S. Appl. No. 11/303,135, filed on Apr. 14, 2010.

Larson, B.; Distributed Aperture Display; Office Action for U.S. Appl. No. 11/303,135, Notification Date Oct. 29, 2010.

USPTO Office Action for U.S. Appl. No. 11/303,135; Notification Date Jul. 15, 2011.

JP Office Action for Patent Appln No. 2007-549483 dated Jan. 5, 2011.

Larson, B.; Distributed Aperture Head-Up Display; Office Action for U.S. Appl. No. 11/303,135, Notification Date Apr. 1, 2011.

EP Communication, EP 05854734.0-2217 dated Jun. 24, 2011.

JP Office Action, JP 184289 dated Jun. 13, 2011.

JP Office Action, JP 2007-549483 dated Nov. 8, 2011.

KR Office Action, 10-2007-7016144, dated Apr. 12, 2012.

* cited by examiner

DISTRIBUTED APERTURE HEAD-UP DISPLAY

CROSS-REFERENCE TO RELATED APPLICATION

This application claims the benefit of U.S. Provisional Application No. 60/639,876 filed Dec. 29, 2004.

TECHNICAL FIELD

The present invention generally relates to displays, and more particularly, to displays comprising an array of pixels with viewing optics.

BACKGROUND

There are many applications today that utilize displays formed from an array of individually addressable pixels. For convenience of description these are hereafter referred to as "pixeled displays." The optical images to be presented by such displays are formed by activating various combinations of the individual pixels. An electrical or other signal causes portions of the various pixels to switch ON or OFF. The switched portions of the pixel may become transparent or opaque to a backlight or become luminous or dark, depending upon the type of pixel employed. In many display types, intermediate levels between full ON and OFF are also possible, for example by analog switching or pulse width modulation. In this way a light image is presented to the viewer. Liquid crystal (LC) and plasma flat panel displays are non-limiting examples of such pixeled displays. The present invention is also applicable to other types of pixeled displays and such are intended to be included. The prior art and the present invention are described herein for the case of a transmissive type liquid crystal display (LCD) but this is merely for convenience of explanation and not intended to be limiting.

FIG. 1A illustrates typical individual pixel 10 of a transmissive type liquid crystal display (LCD) according to the prior art and FIG. 1C illustrates liquid crystal display (LCD) panel 20 formed from an array of prior art pixels 10 of FIG. 1A. While only a small number of pixels are shown in FIG. 1C, it may be thought of as representing the whole LCD display or any sub-portion thereof. The exact number of pixels is not critical for the present invention. Individual pixels 10 comprise (e.g., in a transmissive LCD panel) region 12 that may be made transmitting or luminous by, for example, electrical activation of the pixel, and surrounding region 14 that is ordinarily opaque and dark and usually contains the various electrical leads and other circuitry needed to drive the pixel as well as light blocking layers covering various portions of the display. These light blocking layers are often used to mask edge effects in the pixels or to shield the circuitry from incident light. Thus, depending upon whether pixel 10 is activated or not, region 12 may be transparent (luminous) or opaque (dark). By being switchable between ON and OFF, region 12 is considered the active aperture or switchable region of the pixel. The terms "active aperture" and "switchable region" are used interchangeably herein to refer to that portion of the pixel whose luminosity or transparency may be altered by an electrical signal. Region 14 is generally opaque and dark and is therefore the inactive aperture or non-switchable region of the pixel. In some displays, region 12 is ordinarily opaque (dark) and becomes transparent (luminous) upon activation and in some it is ordinarily transparent (luminous) and becomes opaque (dark) on activation. For the present invention, it does not matter which arrangement is used. For convenience of explanation, it is assumed hereafter that region 12 (and its equivalents in the present invention) is ordinarily opaque (dark) when in the OFF state and becomes transparent (luminous) when activated, that is, when switched into the ON state, but this is not intended to be limiting. FIG. 1B represents another typical prior art aperture configuration for pixel 10, differing from FIG. 1A only in that the active aperture is reduced in the vicinity of portion 16. Portion 16 represents typical loss of active pixel aperture in an active matrix display, and is usually occupied by a small electronic driver circuit or region (e.g., one or more thin film transistors referred to as TFTs) that activates pixel 10 and by any associated light blocking structures. The presence or absence of portion 16, and the degree to which it impacts the corner of the active aperture varies with the details of prior art displays. In general, it is desirable to minimize the size of portion 16, thereby maximizing the active aperture. The aperture ratio (AR) of a pixel is defined as the proportion or percentage of the total pixel area that is switchable and can be made transparent (luminous). In the case of pixel 10, the AR is the area of region 12 divided by the sum of the areas of regions 12 and 14, or in other words the AR is the ratio of the active pixel aperture (switchable region) to the total pixel aperture, where total pixel aperture is the sum of the active aperture (switchable region) plus inactive aperture (non-switchable region). The aperture ratio (AR) is an important property of the pixel (and therefore the whole display) since, other things being equal, the AR determines the brightness of the display for a given drive level. For the present discussion, the active aperture is considered to be transmitting or transparent even if it is not 100 percent transmissive. Many factors impact the transmittance of the active aperture. In an LCD, for example, the transmittance of the active aperture region may be reduced by polarizers, filters, pixel electrodes (either transparent or interdigitated with very fine spacing), spacer balls, alignment layers, microscopic alignment features and other structural components, which are intrinsic to the function of the active aperture. As such, these are considered as affecting the transmittance but not the area of the active aperture. For example, any films or microscopic opaque structures in regions 12 of FIGS. 1A and 1B are considered to not alter the areas of regions 12 if the films or structures are necessary to sustain the intrinsic operation of the device within the active aperture, regions 12.

Pixeled displays have inherent structure. This can be understood by considering a view of display 20 along a particular direction, as for example along line 22 through row 21 of pixels 10 of FIG. 1C. While line 22 is shown as being parallel to row 21 of display 20, this is not intended to be limiting. Other orientations may also be used. For convenience of explanation the suffix "H" is used to refer to periodicity along the horizontal axis (e.g., the rows) of the display and the suffix "V" is used to refer to periodicity along the vertical axis (e.g., the columns) of the display. Persons of skill in the art will understand based on the explanation herein that the designations "horizontal" or "vertical" are merely convenient labels for a set of orthogonal axes and need not correspond to any particular direction or plane in space. When all pixels 10 of display 20 are ON, i.e., transparent or luminous, then optical response plot 24 of FIG. 1D shows the light/dark structure presented by the display along line 22 as a consequence of its physical structure. Light signals 23 (1=ON) are provided by transparent or luminous regions 12. These are separated by dark signals 25 (0=OFF) provided by opaque or dark regions 14. Optical periodicity 26H' between adjacent light (or dark) regions in FIG. 1D is the same as physical periodicity 26H of pixels 10 in display 20 in FIG. 1C and is an inherent property of the physical structure of display 20. FIG. 1E illustrates optical output 27 having optical periodicity 28H' along line 22 when every other pixel is ON (portion 23') and every other pixel is OFF (portion 25'), corresponding to physical periodicity 28H of FIG. 1C. In FIG. 1E, OFF portion 25' corresponds to dark regions 14 and an intervening region 12 that is not activated, i.e., that is OFF. Periodicity 28H, 28H' determines the finest grained, the most detailed, optical output that can be presented by display 20. In the example of FIGS. 1C-E, dimension 28H, 28H' is twice dimension 26H, 26H'. In display 20 using square pixels 10, horizontal periodicity 26H, 28H and vertical periodicity 26V, 28V are substantially the same, but this is not essential.

The above-described inherent structural periodicity is a significant limitation of pixeled displays since it can create undesirable and distracting visual artifacts in the display output that have nothing to do with the information desired to be presented. Examples of such artifacts are Moiré patterns, "screen door" effects, and the like, which are well known in the art. Prior art attempts to minimize these artifacts have involved using smaller pixels, providing diffuser screens or anti-glare films on the display output, providing very high aperture ratios, and so forth. While these may be helpful in ameliorating some of the inherent artifacts, they have undesirable side effects such as for example, decreased aperture ratio, decreased display efficiency, increased complexity and cost and, sometimes, other visual artifacts (e.g., a speckled appearance). Thus, there continues to be a need for reducing the visual artifacts arising from the inherent structure of pixeled displays.

Accordingly, it is desirable to provide an improved display and method, especially for reducing the undesirable optical artifacts arising from the physical pixel structure of the display. In addition, it is desirable that the improved display and method be simple, rugged and reliable and not require an increase in the number of pixels being addressed. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for displaying an image to a viewer with reduced visual artifacts. The apparatus comprises a display panel for forming the image using an array of pixels with distributed active regions, and a viewing arrangement optically situated between the display panel and the viewer for transferring the image formed on the display panel to the viewer with limited angular pixel subtense. The distributed active regions of the pixels are desirably divided into at least two simultaneously switched portions at least partly separated by or surrounding a significant portion of the non-switchable region. First order spatial harmonics and associated artifacts are reduced by the distributed apertures and second order and higher harmonics are reduced by limiting the pixel subtense angle seen by the viewer. A significant reduction in visual artifacts arising from the periodic structure of the display panel is obtained.

BRIEF DESCRIPTION OF THE DRAWINGS

The present invention will hereinafter be described in conjunction with the following drawing figures, wherein like numerals denote like elements.

FIGS. 3A-B are plots of the spatial frequency components in the row and column directions of a pixeled display, wherein FIG. 3A is for a display of the type shown in FIG. 1C according to the prior art and FIG. 3B is for a display the type shown in FIG. 2C according to a first embodiment of the present invention;

FIGS. 5A-H and 5J-P are simplified plan views similar to FIG. 2A of further embodiments of improved pixels according to the present invention;

FIGS. 7A-C are examples of color pixels having red (R), green (G) and blue (B) emitting regions, wherein FIG. 7A shows the prior art and FIGS. 7B-C show examples of color pixels according to still further embodiments of the present invention;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. As used herein, the terms "ON" and "OFF" with respect to switchable pixel elements or regions are intended to include any analog level change in properties and not be limited merely to binary switching.

Figure 1A:
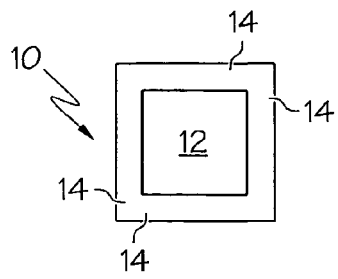
FIGS. 1A-B are simplified plan views of single pixels.
Figure 1B:
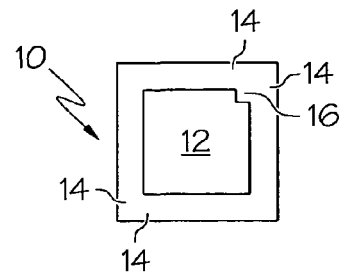
Figure 1C:
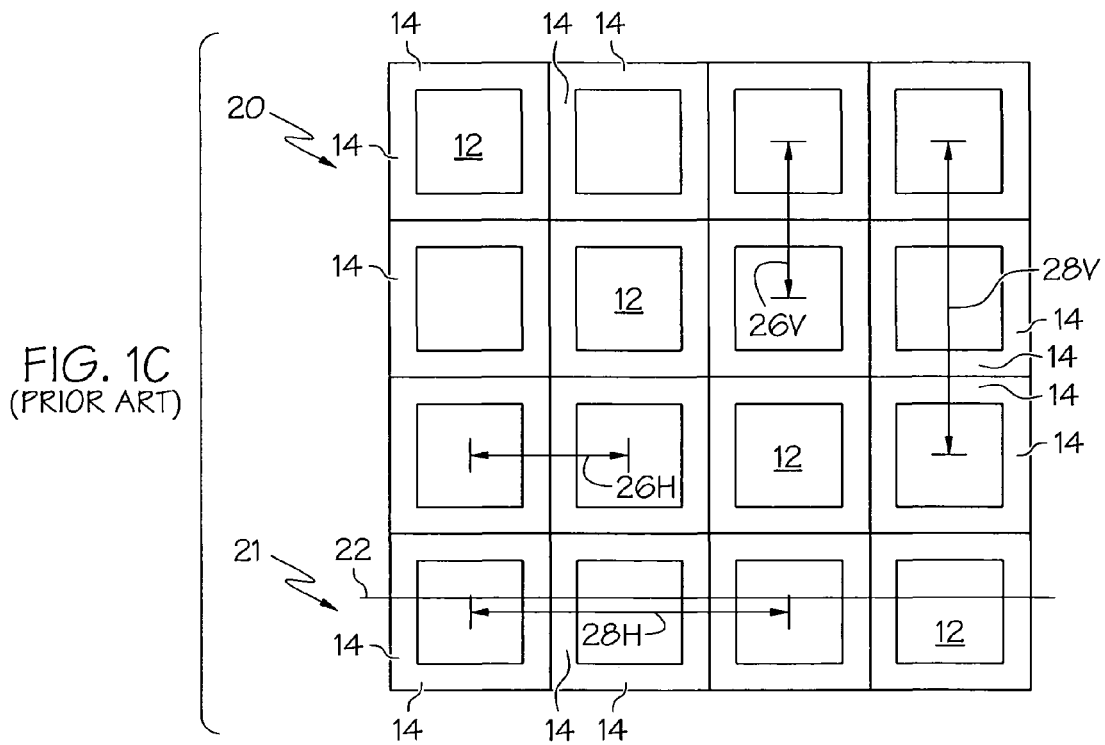
FIG. 1C is a simplified plan view of a display comprising a multiplicity of pixels of the type shown in FIG. 1A and FIGS. 1D-E are simplified plots of the optical output of the display of FIG. 1C along a particular direction (e.g., through a row of pixels in the display), all according to the prior art.
Figure 1D:
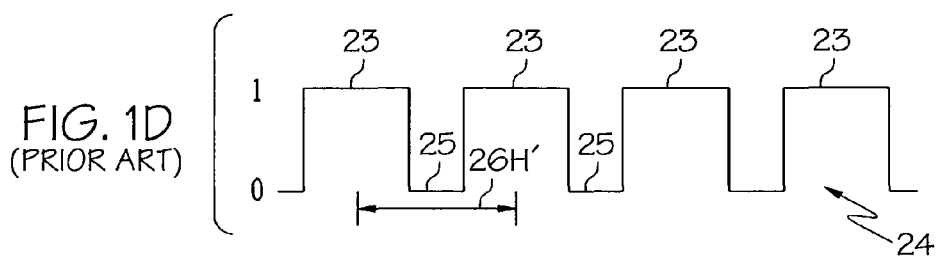
Figure 1E:
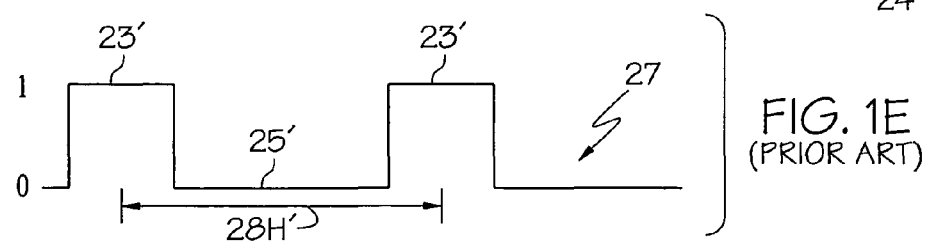
Figure 2A:
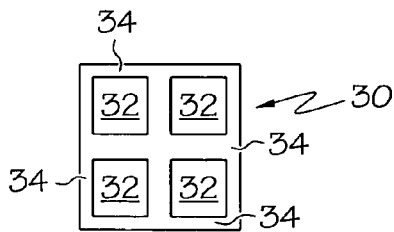
FIGS. 2A-B are simplified plan views, analogous to those of FIGS. 1A-B, of single pixels.
Figure 2B:
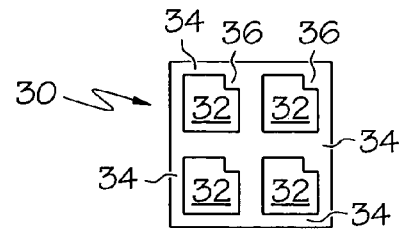
Figure 2C:
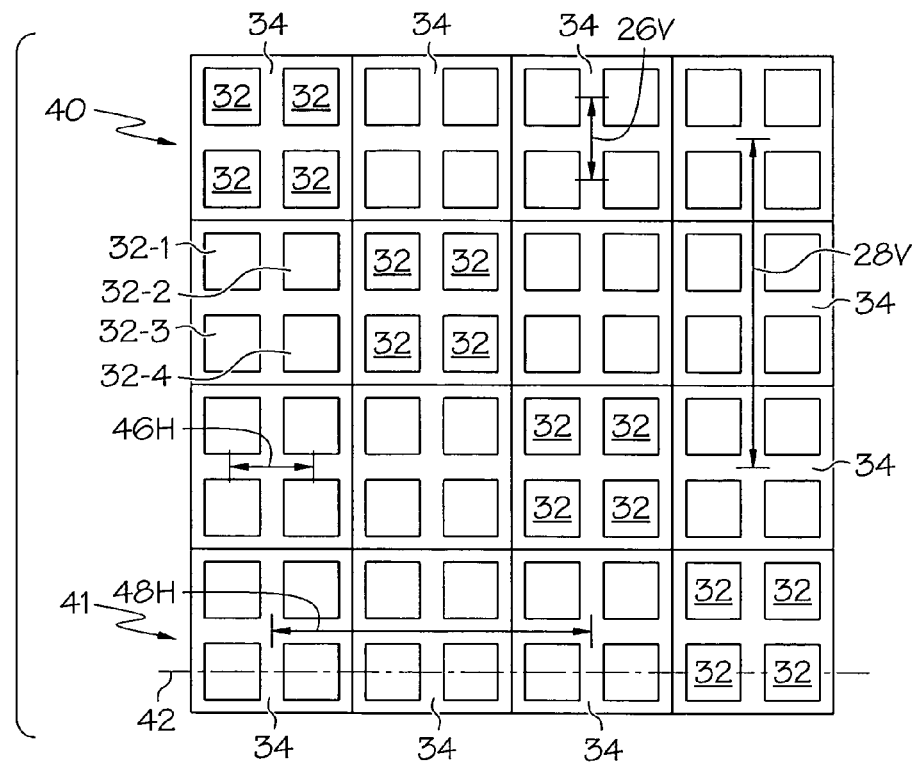
FIG. 2C is a simplified plan view analogous to FIG. 1C of a display comprising a multiplicity of pixels of the type shown in FIG. 2A, and FIGS. 2D-E are simplified plots analogous to FIGS. 1D-E of the optical output of the display of FIG. 2C along a direction through a row of pixels in the display of FIG. 2C, all according to a first embodiment of the present invention.
Figure 2D:
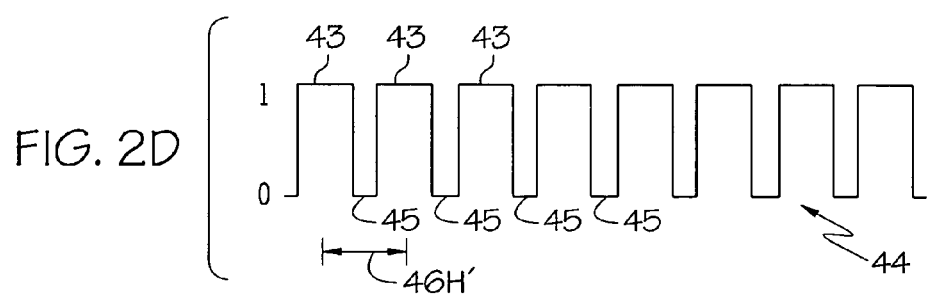
Figure 2E:
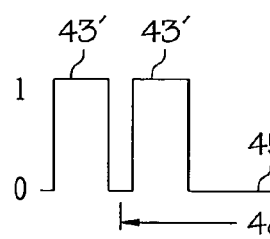

FIG. 2A is a simplified plan view, analogous to that of FIG. 1A of single pixel 30, FIG. 2C is a simplified plan view analogous to FIG. 1C of display 40 comprising a multiplicity of pixels 30 of the type shown in FIG. 2A, and FIGS. 2D-E are simplified plots analogous to FIGS. 1D-E of optical output 44, 47 of display 40 of FIG. 2C along line 42 (e.g., through row 41 of pixels 30 in display 40), all according to a first embodiment of the present invention. FIG. 2B differs from FIG. 2A in that the active aperture is reduced in the vicinity of portion 36, illustrating an analogously scaled comparison to FIG. 1B. Scaling of a conventional active aperture is not required, as shall be seen in subsequent embodiments. For convenience of explanation, the simplified active aperture of FIG. 2A is used in display 40 of FIG. 2C. Additionally, for convenience of explanation and not intended to be limiting, pixels 30 of FIGS. 2A-E are assumed to have the same aspect ratio as pixels 10 of FIG. 1-E, but this is also not essential.

Pixels 30 of FIGS. 2A-C differ from pixels 10 of FIGS. 1A-C in that each pixel 30 has multiple parallel coupled regions 32 able to be simultaneously switched ON (made luminous or transparent) or OFF (made dark or opaque), separated by intervening dark or opaque regions 34. Switchable regions (active apertures) 32 of a particular pixel all turn ON or OFF together, that is, they are electrically and therefore optically coupled in parallel. In the example of FIGS. 2A-2C, there are four rectangular equal size switchable regions 32 (e.g., 32-1, 32-2, 32-3, 32-4) in each pixel 30 as compared to one rectangular switchable region 12 in prior art pixel 10. As will be subsequently explained in more detail, larger or smaller numbers of parallel coupled regions 32 equivalent to regions 32-1, 32-2, 32-3, 32-4, etc., and of varying shape and arrangement may be used in each pixel and four regions 32-1, 32-2, 32-3, 32-4, 32 per pixel shown in FIGS. 2A-C are intended to be illustrative and not limiting. As used herein, reference number 32 is intended to include however many parallel coupled, switchable regions (active apertures) as are provided within each pixel 30. Because regions 32 of each pixel are coupled in parallel, display 40 of FIG. 2C functions in the same manner as prior art display 20 as far as programming or driving the display is concerned, that is, no substantial changes need be made in the driving electronics or driving program. This is a significant advantage and particular feature of the present invention. However, the optical image that results has much improved properties as far as structure related optical artifacts are concerned.

Referring now to FIGS. 2D-E, while line 42 is shown as passing through row 41 of display 40, this is not intended to be limiting. Other orientations may also be used. When all pixels 30 are ON, then optical response plot 44 of FIG. 2D shows the light/dark structure presented by the display as a consequence of its physical structure. Light or luminous (1=ON) signals 43 are provided by transparent or luminous regions 32, also referred to collectively within a pixel as active aperture or switchable region 32. Output signals 43 from transparent or luminous regions 32 are separated by black or dark (0=OFF) signals 45 provided by opaque or dark regions 34, also referred to as inactive aperture or non-switchable regions 34. Optical periodicity 46H' between light (or dark) regions in FIG. 2D is the same as physical periodicity 46H of switchable regions 32 of pixels 30 in display 40 in FIG. 2C and is an inherent property of the physical structure of display 40. It will be noted that in the example of FIG. 2C, periods 46H, 46H' of FIGS. 2C-D are one half that of analogous periods 26H, 26H' of FIGS. 1C-D. Stated another way, the structure induced spatial frequency exhibited by display 40 of FIG. 2C is twice that obtained from prior art display 20 of FIG. 1C. FIG. 2E illustrates optical output 47 having optical periodicity 48H' along line 42 when every other pixel is ON (portion 43') and every other pixel is OFF (portion 45'), corresponding to physical periodicity 48H of FIG. 2C. In FIG. 2E, OFF portion 45' corresponds to dark regions 34 and intervening regions 32 that are not activated, i.e., that are in the OFF state. Periodicity 48H, 48H' determines the finest grained, the most detailed, optical output that can be presented by display 40 and is substantially the same as for prior art display 20 of the same pixel size. In the example of FIGS. 2C-E, dimension 48H, 48H' is approximately four times dimension 46H, 46H', but this is not essential. Analogous periodicity 46V, 48V also exists in the vertical (column) direction of display 40. When pixels 30 are substantially square, horizontal and vertical periodicity (and spatial frequencies) of display 40 are substantially the same, but this is not essential.

Figure 3A:
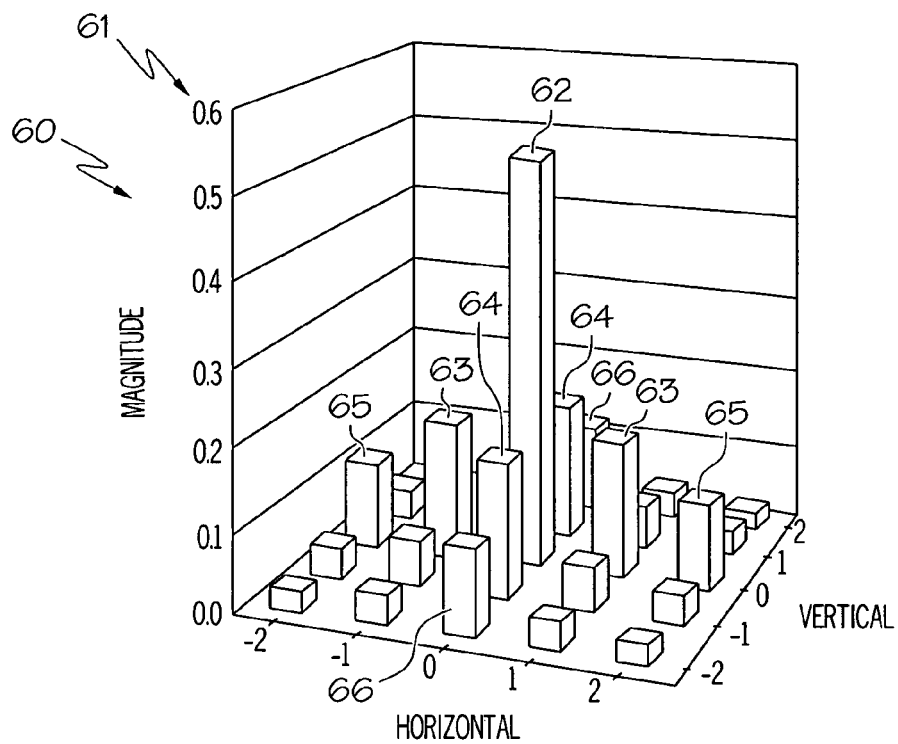
Figure 3B:
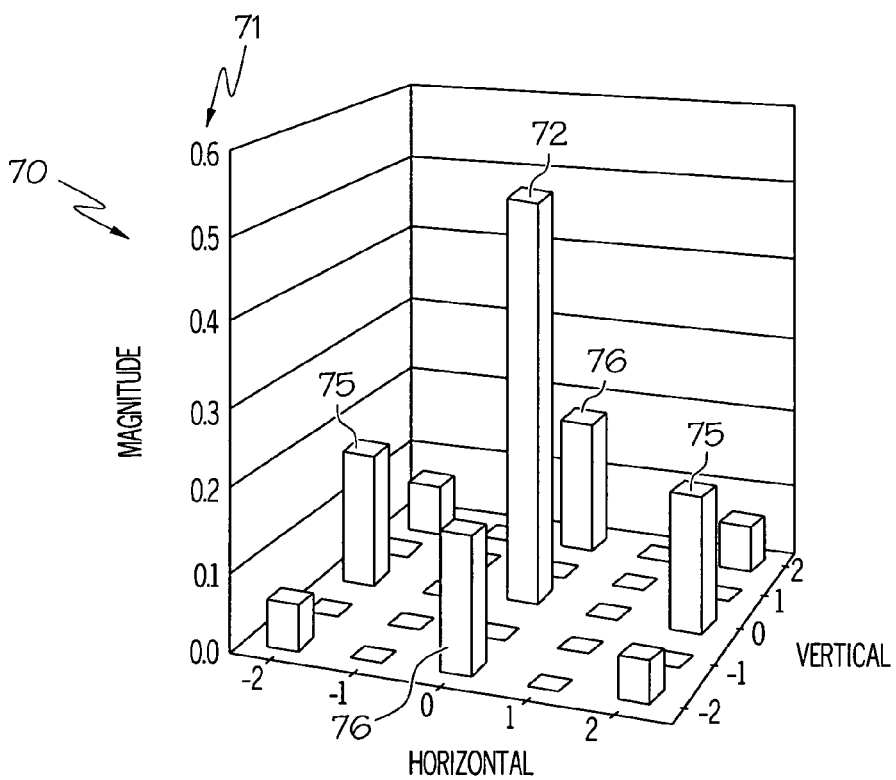

FIGS. 3A-B are plots 60, 70 of the spatial frequency components in the row and column directions of a pixeled display, wherein plot 60 of FIG. 3A is for a display of the type shown in FIG. 1C according to the prior art and plot 70 of FIG. 3B is for a display of the type shown in FIG. 2C. Vertical axes 61, 71 are the magnitudes of the spatial frequency components determined from Fourier transforms of the square aperture spatial patterns illustrated for display 20 of pixels 10 of FIG. 1A and for display 40 of pixels 30 of FIG. 2A. Use of Fourier transforms to obtain frequency components arising from a modulated signal pattern (e.g., see FIGS. 1D-E and 2D-E) is well known in the art. Since pixels 10 and 30 of FIGS. 1A, 2A are symmetric with respect to the horizontal (row) and vertical (column) directions, so are the resulting spatial frequency components. The edges of the base planes in FIGS. 3A-B correspond to the spatial frequencies in the horizontal (row) and vertical (column) directions of the display (see FIGS. 1C, 2C). The numbers (−2, −1, 0, 1, 2) along the base plane edges correspond to the low order frequency components obtained from the Fourier transforms, where "0" is the average or constant term, "1" the first harmonic, "2" the second harmonic, etc. The magnitude of (0,0) frequency components 62, 72 (the tall central columns in FIGS. 3A-B) correspond to the aperture ratio or average fraction of transmitting (luminous) area relative to the overall pixel area. Columns 62, 72 are of the same magnitude in FIGS. 3A-B since pixels 10, 30 are assumed to have the same aperture ratio.

Referring now to FIG. 3A showing the results of analyzing the prior art structure of FIG. 1C, columns 63 and 64 for the (±1, 0) and (0, ±1) terms represent the relative magnitude of the first spatial frequency harmonics in the horizontal and vertical directions respectively, where the ordered pair represents the harmonic numbers for H and V. Columns 65, 66 at the (±2, 0) and (0, ±2) locations represent the relative magnitude of the second spatial frequency harmonics in the horizontal and vertical directions respectively, and so on. Cross terms, e.g., (1, −1), (−1, −1), (−2, −2), (−2, −1), etc., are also present with the prior art arrangement, as well as additional higher harmonics not plotted. Each harmonic that is present, especially the lower order harmonics, contributes to the artifacts that may be observed in displays using the prior art pixels of the types illustrated in FIGS. 1A-E. The higher order harmonics are generally relatively less visible for typical displays.

FIG. 3B shows the results of the same analysis performed on the structure of FIG. 2C using the invented pixels of the type shown in FIG. 2A. While the magnitude of the (0, 0) constant term 72 is unchanged, the first harmonics corresponding to the (0, ±1) and (±1, 0) terms are eliminated substantially completely due to the symmetric nature of the pixels and the multiple active aperture regions in each pixel. Since the first harmonics are the most visible of the lower order harmonics and give rise to the most observable artifacts, their substantial reduction or elimination provides a significant improvement in display quality, that is, the visual artifacts associated with these spatial frequency terms are effectively eliminated. The (0, ±2) and (±2, 0) terms are larger in FIG. 3B for the present invention as compared to the prior art results in FIG. 3A, but this is a secondary concern, since the higher order spatial frequency harmonics are generally much less visible and therefore the increase in the magnitude of these components is often not seen. The lowest order cross terms (e.g., (1, −1), (−1, −1), (−1, 1), (1, 1)) are also substantially eliminated, thereby removing another potential source of visual artifacts. Certain higher order cross terms (e.g., (2, 2), (2, −2), etc.) are increased but since these are inherently less visible, this also does not matter. Thus, what has been accomplished by the invented arrangement is to move the energy in the spatial frequencies to higher order terms that are inherently less visible and thereby reduce the impact of the lower order terms that are visible, resulting in an overall improvement in display quality. This is highly desirable.

Figure 4:
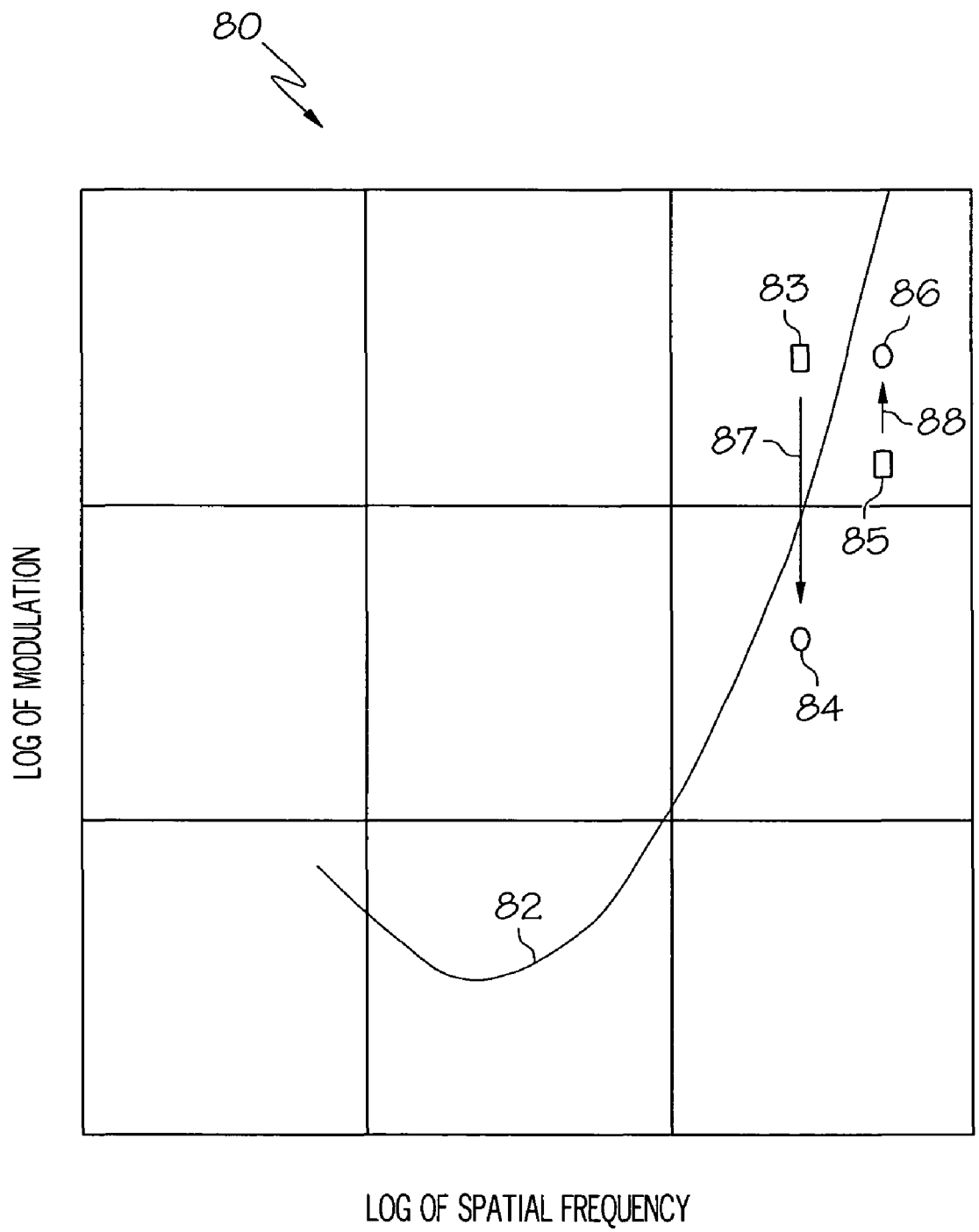
FIG. 4 is a simplified plot of modulation versus spatial frequency for a pixeled display and a conceptual threshold of visibility.

Another way of appreciating the performance advantage of the present invention compared to the prior art, is to consider plot 80 of modulation versus spatial frequency illustrated in FIG. 4. Curve 82 illustrates conceptually the demarcation between visible and invisible visual artifacts in a display. Modulation levels above curve 82 for a given spatial frequency are generally visible, with degree of visibility increasing with higher modulation, and therefore detract from the quality of the display and those below curve 82 generally are not readily visible and therefore can be ignored. When a prior art display of the type shown in FIG. 1C is driven by a uniform signal (e.g., all white or a single color fully ON) the first harmonic output falls at location 83 and generally provides a readily visible "screen door" effect. The second harmonic generally falls at about location 85 and is generally not visible. When a display utilizing the invented pixels of the type shown in FIG. 2C is used the first harmonic output is much reduced as shown by arrow 87 and falls at location 84 or lower, below detection threshold curve 82. It is therefore invisible. The larger second harmonic term increases as shown by arrow 88 and falls at location 86, but still remains below detection threshold curve 82. It is therefore still invisible. Even if the first order spatial harmonics are not completely eliminated, lowering their magnitude makes the modulation less visible. Thus, the present invention provides a net improvement in display output quality by reducing or eliminating the artifacts that arise from the lower order spatial harmonics of the display structure.

Figure 5A:
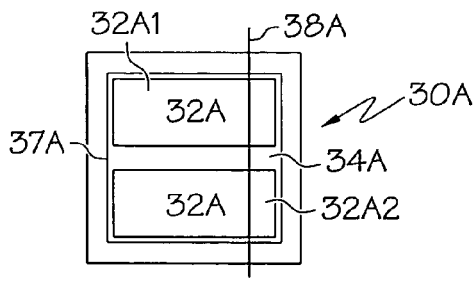
Figure 5B:
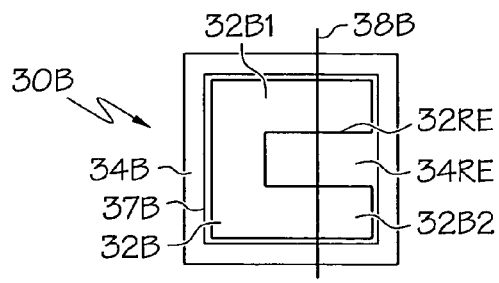
Figure 5C:
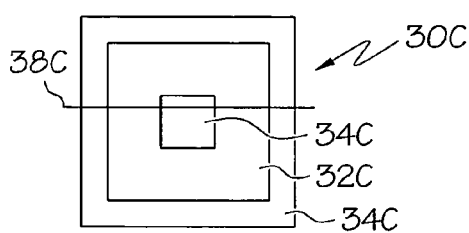
Figure 5D:
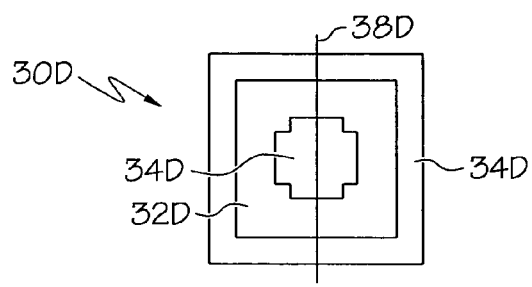
Figure 5E:
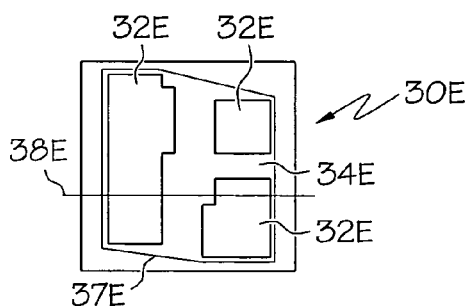
Figure 5F:
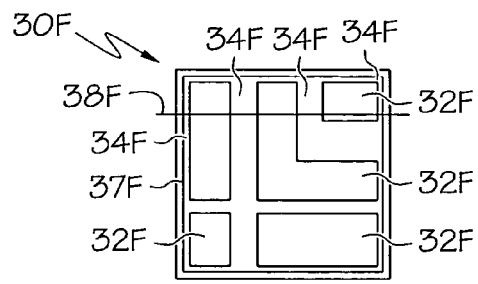
Figure 5G:
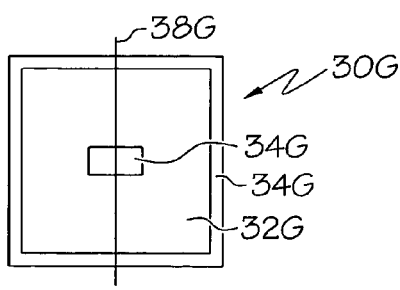
Figure 5H:
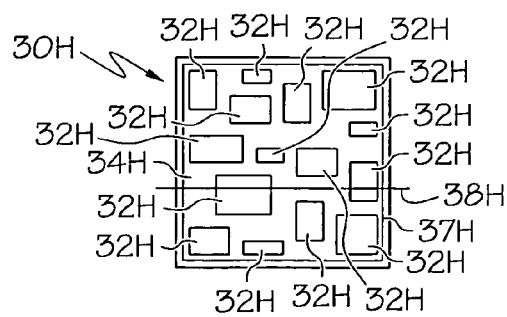
Figure 5J:
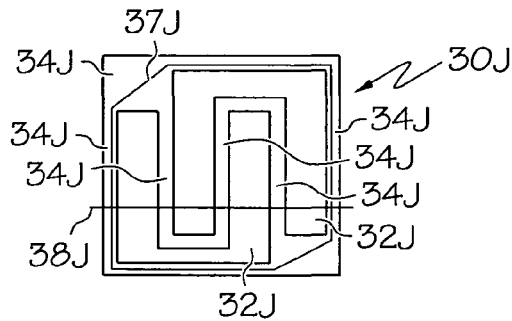
Figure 5K:
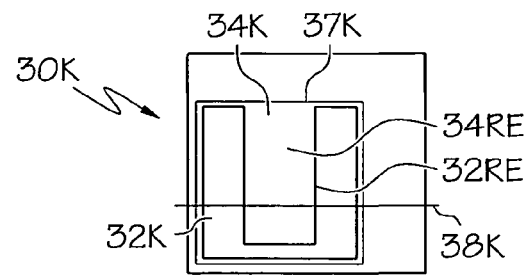
Figure 5L:
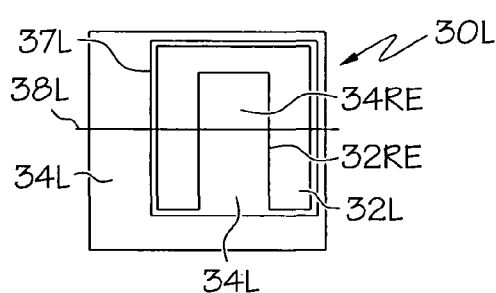
Figure 5M:
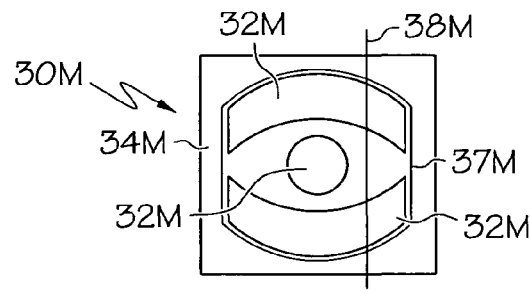
Figure 5N:
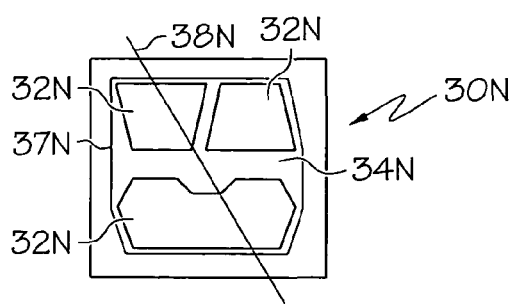
Figure 5P:
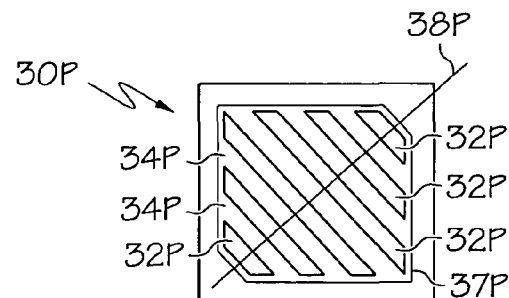

FIGS. 5A-H and 5J-P are simplified plan views similar to FIG. 2A of further embodiments of improved pixels according to the present invention. For convenience of description, the switchable (luminous) regions of the pixels are identified by reference number 32 and the opaque (dark) regions by reference number 34, each with suffix, A-P corresponding to the regions illustrated in FIGS. 5A-5P. Thus, pixel 30A of FIG. 5A has active aperture or switchable (luminous) regions 32A separated and surrounded by inactive aperture or opaque (dark) regions 34A, pixel 30B of FIG. 5B has switchable (luminous) regions 32B separated and surrounded by opaque (dark) regions 34B, and so forth for FIGS. 5C-P. The inherent periodicity (and spatial frequency) of the displays formed from the different types of pixels illustrated in FIGS. 5A-P may be different in the horizontal and vertical directions depending upon the number and arrangement of the luminous and dark regions within the pixels and whether they are symmetrical in the horizontal and vertical directions. For purposes of explanation and not intended to be limiting it is assumed that a display panel utilizing one or the other of the different types of pixels illustrated in FIGS. 5A-P is composed of an ordered array of horizontal rows and vertical columns of the same type of pixel, but this is not essential. Different types of pixels may be used in the same display panel and the row and column structure can vary in different locations in the display.

The pixels illustrated in FIGS. 5A-P differ from the prior art in that each pixel has, in at least one direction (e.g., horizontal, vertical or otherwise) multiple simultaneously switched (luminous) regions or active apertures, thereby altering the periodicity and spatial frequency of the display formed from such pixels. For example, FIG. 5A-B are asymmetric with respect to horizontal and vertical directions and have two simultaneously switched (luminous) regions 32A1, 32A2 and 32B1, 32B2 at least partly separated in the vertical direction so that the periodicity and spatial frequency of the resulting display structure is different from the prior art in the vertical direction. Differences in the horizontal direction in FIGS. 5A-B are somewhat less pronounced, but the spatial frequency components of the fixed pattern noise are still suppressed relative to the prior art pixels of FIGS. 1A-B. This is due to the elongated nature of the active aperture in the horizontal dimension, enabled by separating and narrowing the portions in the vertical direction. Other examples, such as FIGS. 2A-B and 5C-D are substantially symmetric with respect to horizontal and vertical axes and so the horizontal and vertical periodicity and spatial frequency will be equally improved via the same mechanism of multiple active aperture portions. FIGS. 5C-D and 5G illustrate arrangements in which switchable region 32 encloses part of non-switchable region 34. FIG. 5H illustrates a substantially random arrangement of multiple simultaneously switched regions. FIGS. 5J-L illustrate use of one or more U-shaped switchable regions that may be the same or of different color, as is discussed further below.

Figure 7A:
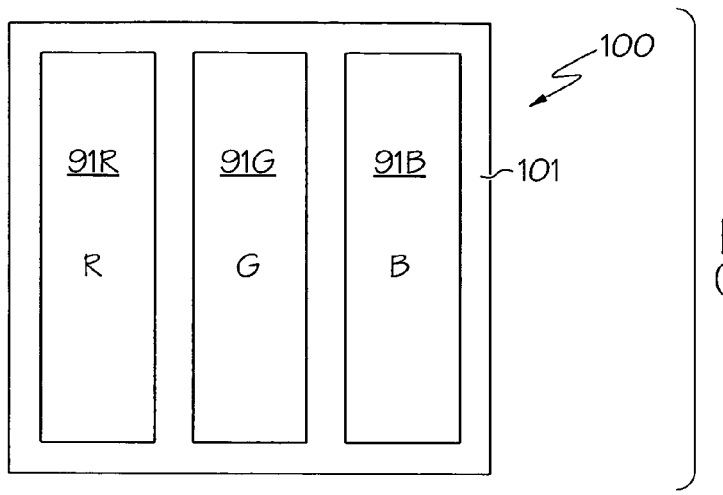

It will be noted that regions 32 in FIGS. 2A-B, 5A-P (and 7B-C) are topologically distributed in some fashion over the pixel as compared to single topological region 12 of prior art pixel 10 of FIGS. 1A-B (or FIG. 7A). For example, in FIGS. 5A, 5E, 5F, 5H, 5J, 5M, 5N and 5P switchable regions 32A, 32E, 32F, 32H, 32J, 32M, 32N, 32P (collectively regions 32) are subdivided into multiple portions topologically separated by parts of opaque or dark regions 34; in FIGS. 5C, 5D, and 5G switchable regions 32 topologically enclose a part of opaque or dark region 34 (alternately stated, non-switchable regions 34 are subdivided into multiple portions topologically separated by parts of switchable regions 32); and in FIGS. 5B, 5K and 5L switchable regions 32 have re-entrant zones 32RE that surround corresponding zone 34RE of dark or opaque regions 34 on substantially three sides. Any of these arrangements is sufficient to modify the inherent spatial periodicity and spatial frequencies exhibited by display 40 so as to reduce, at least in part, the artifacts exhibited by the display as compared to the prior art. Stated another way, it is sufficient that in tracing a line, e.g., lines 38A-P of FIGS. 5A-P (collectively line 38), across a pixel of the present invention, especially in a direction parallel with the rows or columns of the display, that such line pass from one portion of the switchable region to at least another portion of the switchable region across a significant part of the non-switchable region. The at least two portions of the switchable region crossed by the line may be topologically separated (e.g., FIGS. 2A-B, 5A, 5E, 5F, 5H, 5J, 5M, 5N and 5P) or elsewhere coupled (e.g., FIGS. 5B, 5C, 5D, 5G, 5K and 5L). Either arrangement works.

It is desirable that the distributed portions involve a topologically significant part of the switchable and non-switchable regions. This is satisfied in FIGS. 2A-B and 5A-P in two ways. The first way, based on general topological principles, is for those embodiments (identified previously) where either the active aperture or the inactive aperture is subdivided into multiple portions topologically separated by parts of the inactive or active aperture, respectively. The second way assesses the extent to which the inactive aperture (non-switchable region) is interspersed within an active aperture envelope defined for the pixel. As described previously, FIG. 5E shows the pixel 30E including active apertures 32E and inactive apertures 34E. Envelope 37E in FIG. 5E is the outermost perimeter of all lines connecting all possible pairs of points within regions 32E. Envelope or perimeter 37E, and analogous envelopes 37A, 37B, 37F, 37H-P (collectively envelopes or perimeters 37) may be thought of as being formed by a string lying in the plane of the pixel and wrapped snugly around the active apertures of the pixel, following the outer contours of the active apertures and bridging any gaps therebetween. In FIGS. 5A-B, 5E-F, 5H-P envelopes or perimeters 37 are shown as being slightly spaced from the outward edges of the apertures, but this is merely for convenience of illustration, so that such envelopes or perimeters may be easily seen in the figures.

The interspersed percentage for pixel 30E (and similarly for the other pixels in FIG. 5) is defined as the ratio of the portion of non-switchable area 34E contained within envelope 37E, divided by the total area of non-switchable region 34E. For the prior art pixel example in FIG. 1A, the interspersed percentage is 0%, and for the prior art pixel of FIG. 1B, for example, only 13% of the non-switchable region, roughly half of the notched corner, is interspersed within the envelope as defined. In comparison, the exemplary reentrant pixels of FIGS. 5B, 5E, 5F, 5H, and 5K have interspersed percentages of 31%, 33%, 65%, 67%, and 34%, respectively. Preferably, a significantly distributed pixel will have either multiple active or inactive apertures (which may or may not be topologically connected) and an interspersed percentage of greater than about 15%, or more preferably greater than about 25%. Thus, as used herein, the term a "significantly distributed" pixel is a pixel having at least about fifteen percent (15%) of the inactive aperture (non-switchable region) interspersed between portions of the active aperture (switchable region). Stated another way, a "significantly distributed" pixel is a pixel in which at least 15% and preferably 25% of the inactive aperture (non-switchable region) lies within an outer perimeter of the active aperture(s), i.e., perimeter 37 described above.

The present invention is applicable to both monochrome displays and color displays. Color may be achieved through any known method, including various forms of additive color, time sequential color, subtractive color or other means. Preferably, a color display will have reduced artifacts no matter which color is being displayed. The embodiments of FIG. 5J-L are well suited for use as a two-color display system, such as green and red constituent color regions that might be used in a display. Pixel 30J comprises two separated active or switchable regions 32J, also shown independently in FIGS. 5K-L as active apertures 32K and 32L. In the present embodiment active region 32K provides a first constituent color, such as green, and switches simultaneously, meaning that the same control signal is used to drive the entire region and different portions of that region cannot be addressed independently from other portions of the region. Active region 32L provides a second constituent color, such as red, and similarly switches simultaneously. Pixel 30J comprises both constituent color regions or sub-pixels and is capable of the range of output chromaticity of the matrix display. The two color regions 32K and 32L are independently switchable with respect to each other and act in concert as a minimum switchable picture element. Due to the topology of regions 32K and 32L as described above, each of the constituent colors is characterized by a significantly distributed aperture within pixel 30J-L, which means that the active pixel aperture for any output chromaticity setting of the pixel is substantially distributed in the area of pixel 30J. This distributed performance arises in this case by multiple portions along the horizontal axis and portions along the vertical axis that are elongated relative to a corresponding symmetric aperture having the same area as the constituent color region in question, for example a square opening as shown in FIG. 1A. The resulting performance improvement from spreading out or distributing the aperture for individual constituent colors is significant for any pixeled display. The embodiment described is not intended to be limiting. Constituent colors can be different, or additional constituent colors can be used. A subset of the constituent colors may be distributed and others not substantially distributed in the pixel.

Figure 6:
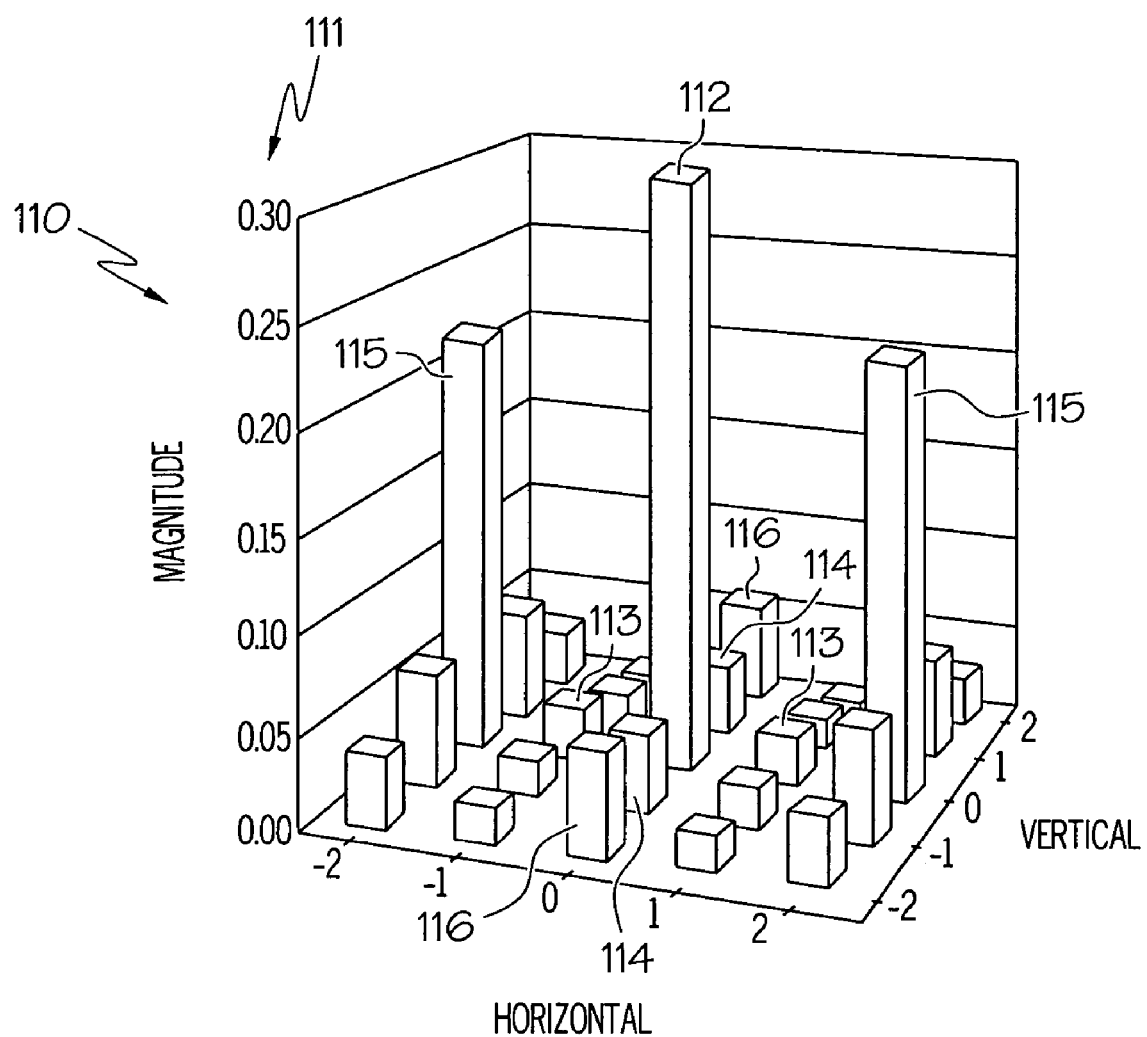
FIG. 6 is a plot similar to that of FIGS. 3A-B for a further embodiment of the present invention.

FIG. 6 presents Fourier Transform results 110 of the spatial frequency components obtained for constituent color aperture 32K of FIG. 5K in the two-color embodiment of pixel 30J in FIG. 5J. Chart 110 of FIG. 6 is analogous to charts 60, 70 of FIGS. 3A-B, and shows that practical modifications to the aperture patterns can be made without sacrificing the benefits of the present invention. Magnitude scale 111 of FIG. 6 is half that of vertical magnitude scales 61, 71 of FIGS. 3A-B. Horizontal first harmonics 113 (e.g., the ±1, 0 term) have been suppressed by the dual leg feature of the active aperture, with a corresponding increase in second harmonic 115 (e.g., the ±2, 0 term) as there are two legs on the active aperture with their centers separated by approximately half the pixel pitch. The connecting portion between the two legs simplifies the connection between them and also increases the aperture ratio. This raises the first harmonic magnitude (horizontal) slightly, but it remains very low. Unlike FIGS. 3A-B, the vertical performance is notably different than the horizontal performance. The pixel is not fully balanced vertically but its vertical first harmonic magnitude 114 (e.g., the 0, ±1 term) is still very low compared to (0, 0) component 112 due to elongation of the legs. The first harmonic is less than a third of the first harmonic for a square constituent color switchable region having the same area. Vertical second harmonic 116 is clearly lower than horizontal second harmonic 115, as would be expected due to the lack of repeated features at half pitch in the vertical direction in pixel 30K.

Figure 7B:
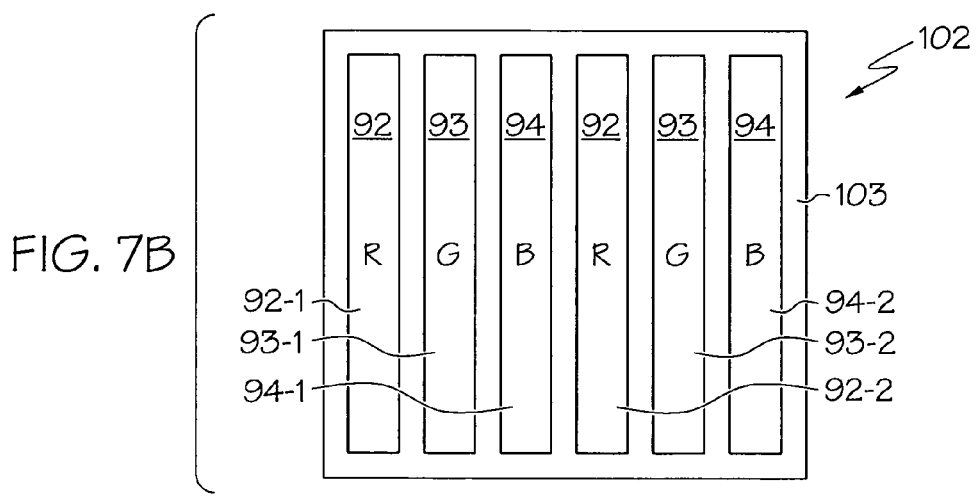
Figure 7C:
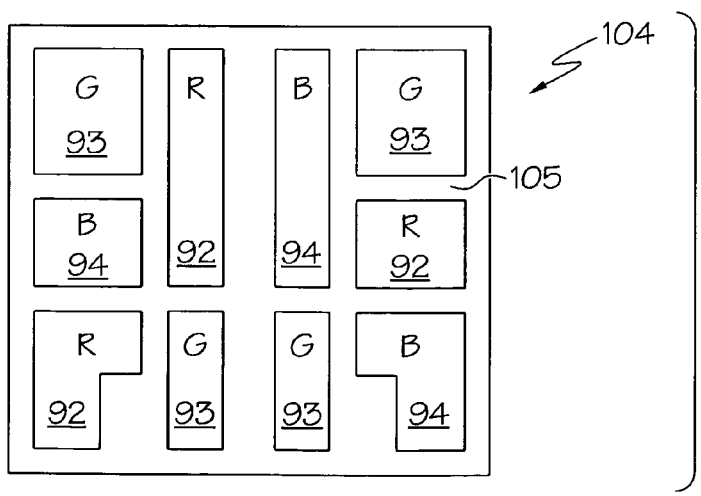

FIGS. 7A-C are examples of color stripe pixels having red (R), green (G) and blue (B) emitting or luminous regions. FIG. 7A shows prior art pixel 100 having red, green and blue switchable (luminous) regions 91R, 91G, 91B respectively separated by opaque (dark) regions 101. FIGS. 7B-C show color pixels 102, 104 according to a further embodiment of the present invention. In FIG. 7B-C, single color regions 91R, 91G, 91B of the prior art are replaced by multiple, spaced-apart color regions 92, 93, 94 separated by dark or opaque regions 103, 105 where each switchable color emitting region or sub-pixel has at least two spaced apart portions, e.g., 92-1, 92-2; 93-1, 93-2; 94-1, 94-2, analogous to spaced apart portions 32-1, 32-2, etc., in pixels 30. Pixel 104 of FIG. 7C and pixel 102 of FIG. 7B represent two exemplary configurations for full color distributed apertures. It is understood that in FIGS. 7B and 7C the various same-colored portions with like reference numbers are switched together, i.e., all green portions together, all red portions together and all blue portions together, and that in general the different constituent colors are independently switchable, thereby allowing pixels 102, 104 to provide the range of output chromaticity of the display. In each of pixels 104 and 102, each of the constituent colors has a significantly distributed aperture. In other words, the artifact suppression benefit applies to any addressable color or chromaticity of the display, even when only a single color is turned ON. This is markedly different from the prior art pixel of FIG. 7A, where turning ON only a single color, e.g., switchable region 91G, results in a very high and potentially visible first harmonic.

Table I below compares the magnitude of the various spatial harmonic terms obtained by Fourier analysis for different pixel designs. The CONFIG column identifies the pixel configuration for which the data was obtained, keyed to the number of the relevant representative figure. For example, configuration 1A refers to pixel 10 in FIG. 1A, configuration 1B refers to the pixel configuration illustrated in FIG. 1B, configuration 5C refers to the pixel illustrated in FIG. 5C and so forth. The column headed "AR" shows the (0, 0) terms, which is the aperture ratio for the particular pixel. There are two groups of columns headed "H", "V", "++", "+−". The first group labeled "Low Order Harmonics" contains unscaled values of the magnitude of the Fourier terms. The second group labeled "% Relative to Square Aperture" scales the values in the first group relative to corresponding magnitudes for a square reference aperture of the same aperture ratio (e.g., aperture 12 of pixel 10). The entries in the columns headed "H" are the sum of the magnitudes of the (1, 0)+(−1, 0) terms. The entries in the columns headed "V" are the sum of the magnitudes of the (0, 1)+(0, −1) terms. The entries in the columns headed "++" are the sum of the magnitudes of the (1, 1)+(−1,−1) terms. The entries in the columns headed are the sum of the magnitudes of the (1,−1)+(−1, 1) terms. In relating the entries in Table I with the various pixel configurations illustrated in FIGS. 1-5, it should be kept in mind that FIGS. 1-5 are not intended to be scale drawings. The aperture ratio (AR) values for the various configurations are provided in Table I.

large notch 16 in the corner. As the simulated pixel had a 0.47 AR (aperture ratio), the relative comparison is to a 0.47 square pixel and is calculated using the values from FIG. 3B. Each of the remaining rows is similarly compared to square pixels having the aperture ratios listed for those rows. The table entries show that the corner notch in FIG. 1B reduces H and V slightly to 93% and 87% of values for a comparable square pixel. CONFIGS 2A through 5L and 7B-C are all improvements based on substantially distributed apertures according to the present invention. The table confirms that each of the first harmonic H and V comparisons are improved (reduced) relative to the prior art CONFIGS 1A and 1B. To constitute a significant improvement, the H and V percentages are preferably less than 80%, more preferably less than 50%, still more preferably less than 25% and most preferably substantially zero. All of the CONFIGS from 2A and below achieve one or more of these preferred levels of artifact suppression. CONFIGS 2A and 5D eliminate both first harmonics and 5A eliminates one of the first harmonics. Comparing CONFIGS 5C and 5D, it is clear from the active aperture shapes in FIGS. 5C-D that small adjustments to the aperture design can dramatically improve the artifact suppression even further. For example, the already excellent first harmonics of 30% and 43% in CONFIG 5C are further reduced all the way to 0% by using CONFIG 5D. CONFIG 5G, with an AR of 0.75, demonstrates effectiveness even on high aperture configurations. CONFIGS 5K and 5L, whether used for monochrome panels or for individual constituent color regions of a two color panel, very effectively reduce H and V as well.

The CONFIG 7A entry provides the simulated results for a prior art single color region 91R in FIG. 7A. As might be expected, the elongated vertical stripe color region compares favorably (38%) with a corresponding 0.15 AR square, but the narrow width makes H even worse (122%) than a square

TABLE I

RESULTS OF FOURIER TRANSFORM ANALYSIS OF THE MAGNITUDE OF THE SPATIAL FREQUENCIES TERMS FOR VARIOUS PIXEL CONFIGURATIONS

| CONFIG | AR | LOW ORDER HARMONICS | | | | % RELATIVE TO SQ. APERTURE | | | |
|---|---|---|---|---|---|---|---|---|---|
| | | H | V | ++ | +− | H | V | ++ | +− |
| 1A | 0.52 | 0.35 | 0.35 | 0.12 | 0.12 | 100% | 100% | 100% | 100% |
| 1B | 0.47 | 0.34 | 0.32 | 0.24 | 0.09 | 93% | 87% | 173% | 65% |
| 7A | 0.15 | 0.28 | 0.09 | 0.08 | 0.09 | 122% | 38% | 43% | 49% |
| 2A | 0.52 | 0.00 | 0.00 | 0.00 | 0.00 | 0 | 0 | 0 | 0 |
| 5A | 0.34 | 0.18 | 0.00 | 0.00 | 0.00 | 49% | 0 | 0 | 0 |
| 5B | 0.42 | 0.21 | 0.04 | 0.12 | 0.12 | 57% | 10% | 76% | 76% |
| 5C | 0.50 | 0.11 | 0.16 | 0.07 | 0.07 | 30% | 43% | 56% | 57% |
| 5D | 0.50 | 0.00 | 0.00 | 0.14 | 0.14 | 0 | 0 | 109% | 109% |
| 5E | 0.38 | 0.11 | 0.18 | 0.15 | 0.16 | 31% | 48% | 83% | 89% |
| 5F | 0.45 | 0.09 | 0.05 | 0.16 | 0.12 | 25% | 13% | 103% | 78% |
| 5G | 0.75 | 0.17 | 0.14 | 0.02 | 0.02 | 77% | 62% | 62% | 62% |
| 5H | 0.33 | 0.04 | 0.03 | 0.04 | 0.04 | 11% | 9% | 19% | 22% |
| 5K | 0.32 | 0.06 | 0.10 | 0.04 | 0.04 | 17% | 29% | 18% | 22% |
| 5L | 0.31 | 0.05 | 0.11 | 0.03 | 0.04 | 15% | 33% | 14% | 18% |
| 7B | 0.18 | 0.01 | 0.07 | 0.01 | 0.01 | 4% | 26% | 5% | 5% |
| 7C (G) | 0.18 | 0.00 | 0.12 | 0.17 | 0.17 | 1% | 44% | 90% | 90% |
| 7C (R) | 0.16 | 0.09 | 0.10 | 0.15 | 0.06 | 38% | 42% | 83% | 35% |

CONFIG 1A in Table I captures the values from FIG. 3A. The AR and low order harmonic magnitudes are provided for reference, but the easiest basis for comparison is the "% Relative to Square Aperture" section, and the discussion that follows refers to those entries. Since the pixel of CONFIG 1A has a square aperture, the comparison ratio is unity (100%), by definition. CONFIG 1B is a prior art pixel with relatively region. In comparison, the distributed stripes of CONFIG 7B according to the present invention, provide reduction of H to 4% without sacrificing the vertical performance. Similar performance is seen for the other full color arrangement of CONFIG 7C, with the Fourier Transform analysis of the (G) active aperture 93 and (R) active aperture 92 of FIG. 7C being summarized in the table.

In some situations, the lowest order cross terms, represented in Table I by the ++ and +− columns are also important as they are generally at a spatial frequency higher than the first harmonic but lower than the second harmonic. Table I shows that some configurations are better than others at suppressing the cross terms. The ++ cross term is clearly a weakness for the notched corner of prior art CONFIG 1B, increasing the modulation at that spatial frequency and orientation to 173% of the value for the comparable square aperture. CONFIG 5D is an example that improvement of H and V does not guarantee that ++ and +− will also be reduced, although additional tweaking of the design, for example moving more toward CONFIG 2A can easily bring the cross terms down further. Many embodiments of the present invention will improve all of the first order harmonics and lowest order cross terms relative to the baseline square pixel, for example 2A, 5A, 5B, 5C, 5E, 5G, 5H, 5K, 5L, 7B, 7C(G), 7C(R), whereas this is not observed with CONFIGS 1B and 7A.

The results in Table I show that CONFIG 2A provides the greatest suppression of the otherwise most visible artifacts. The variety and flexible techniques for adapting the distributed aperture are important however in maximizing the performance for available pixel design and fabrication processes. If the multiple region methods are not practical, then other configurations such as 5B can provide an effective starting point. 5K-L are preferred pixels for a two-color system, and 7B is a preferred pixel layout for a three-color system. The practicality of different pixel topographies will likely vary with the display type, for example whether the display modulates the light via transmission, reflection, emission or other means. Many of these or similar distributed aperture configurations can be fabricated in transmissive LCDs, for example by using the techniques described in U.S. Pat. No. 5,563,727, incorporated herein by reference.

While the foregoing discussion has been presented for square pixels, this is merely for convenience of explanation and persons of skill in the art will understand that non-square pixels can also be used. Pixels may be rectangular or any other convenient shape that provides useful display panel packing density. These choices will depend upon the needs of the particular display system being considered and persons of skill in the art will understand how to make such choices depending upon the particular display they are designing.

Figure 8:
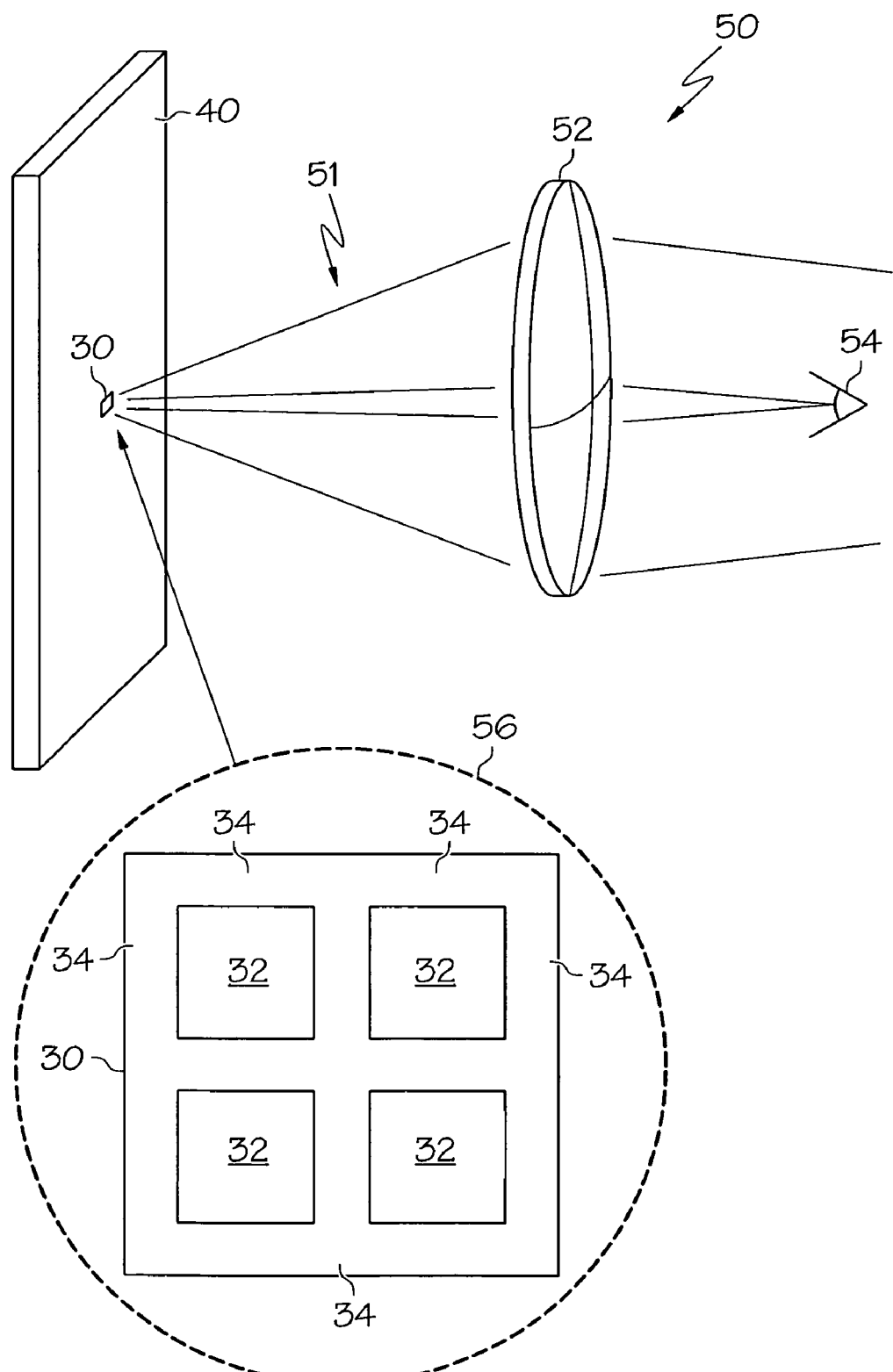
FIG. 8 shows a simplified side view of an optical display system utilizing improved pixels according to a yet further embodiment of the present invention.

The embodiments to this point serve to provide a pixeled display having a suppressed first harmonic of the pixel substructure. The embodiments which follow further enhance the perceived image quality of the pixeled display by suppressing or controlling the visibility of the higher harmonics of the pixel substructure, including for example the second or third harmonics of the pixel substructure. FIGS. 8-11 show various embodiments of optical systems according to the present invention incorporating higher harmonic suppression means. FIG. 8 is a simplified side view of optical display system 50 utilizing improved pixels 30 of the type shown in FIG. 2A, according to the present invention. System 50 comprises display panel 40 having illustrative pixels 30 as previously explained, and lens 52. Lens 52 gathers light rays 51 emitted by display 40 and brings them to viewer 54. As shown in enlarged portion 56, representative pixel 30 has multiple, collectively switchable regions (active apertures) 32 separated by opaque regions 34. Regions 32 within each pixel 30 switch ON and OFF together. Different pixels may be switched independently. While four parallel rectangular switchable regions are illustrated in enlarged portion 56 showing representative pixel 30, this is not intended to be limiting and it is only necessary that the switchable regions (active apertures) be distributed within the pixel and not be a single homogeneous region. Any number of distributed switchable regions (active apertures) can be used and of widely varying shape and arrangement, as has already been explained in connection with FIGS. 5A-H and FIGS. 5J-P.

Lens 52 in FIG. 8 is preferably a collimating lens that alters the apparent or perceived distance from the viewer 54 to display 40. Examples of such a configuration include head-up displays (HUDs), near-to-eye displays, viewfinders and other collimating or magnifying displays. While a simple lens is shown, it is understood that lens 52 may represent simple or complex optical systems and may include one or more refractive, reflective, diffractive, holographic or other optical elements to provide collimation. Collimating and projecting optics often involve magnification of the pixeled display in order to keep the size of the system as small as possible. This can be accomplished for example, by using lens 52 having a focal length that is significantly shorter than typical viewing distances for displays without intervening optics. For example, lens 52 may have a focal length less than 10 inches for a collimated display system, less than 5 inches for a more compact system, and less than one inch for a compact near-to-eye system. Lens 52 is preferably non-diffusing, as diffusion between display 40 and viewer 54 can give rise to random spatial artifacts, for example speckles or graininess, which are made even more noticeable by the magnification involved, especially when movement of the viewer is allowed as is the case with most collimated displays. The present invention can still be used to improve performance however even if diffusion is used, provided the screen or other diffusion element does not substantially degrade the desired image data at spatial frequencies below the first harmonic component of the pixel structure.

Collimation in the embodiment of FIG. 8 serves as an effective means to limit the angle subtended by pixel 30 (hereafter the "angular subtense"), that is, the angular size of each pixel 30 as seen by viewer 54. This provides a way to ensure that the fixed pattern spatial noise or artifacts in display 40 occur at a known or controllable spatial frequency. Lens 52 converts the intrinsic linear spatial frequency, e.g., pixels/mm, into an angular spatial frequency, e.g., pixels/degree. The angular spatial frequency is substantially insensitive to motion of viewer 54. In this way, the suppression of these artifacts is consistent. The visibility of artifacts (including both lowest and higher order harmonics) does not change if, for example, viewer 54 inadvertently moves forward. By adjusting the relationship between the pixel size and the focal length appropriately, the angular subtense of the pixel is limited and the higher order harmonics are effectively suppressed for the viewer.

Figure 9A:
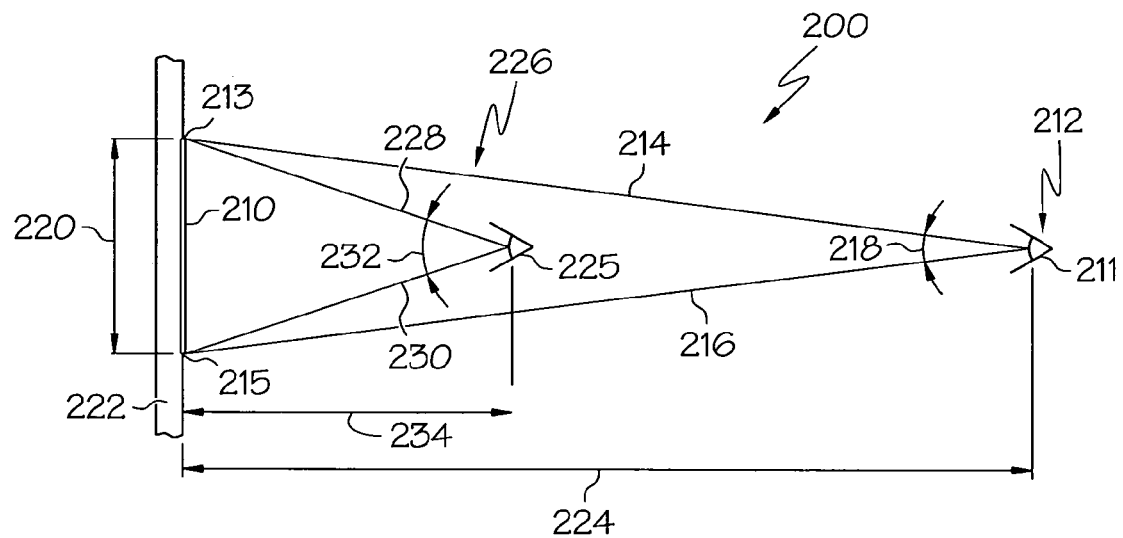
FIGS. 9A-B show simplified schematic side views of an optical display system according to additional further embodiments of the present invention, in which preferred angular pixel subtenses for viewing distributed aperture pixels are illustrated.
Figure 9B:
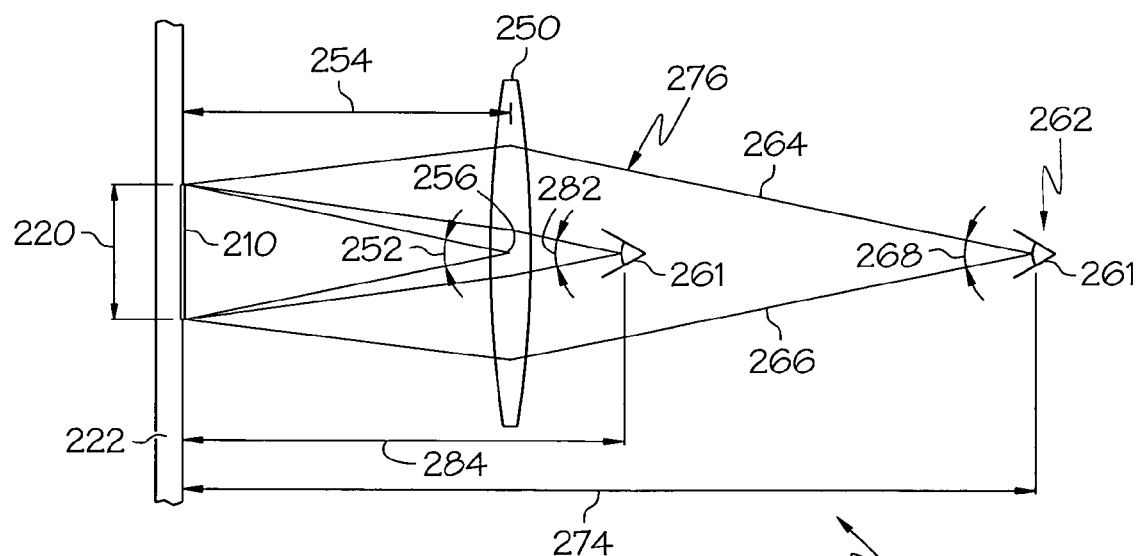

FIGS. 9A-B show simplified schematic side views of optical display systems 200, 202 according to further embodiments of the present invention, in which the angular subtense limiting effect is depicted in more detail. FIG. 9A shows a simplified schematic side view of optical display system 200 having pixeled display 222 containing distributed aperture pixel 210. Only single pixel 210 is shown, somewhat exaggerated in size for clarity, although display 222 is assumed to contain a plurality of said pixels. When observed by viewer 211 from vantage point 212 located distance 224 from pixel 210, top 213 and bottom 215 of the pixel 210 are visible as rays 214 and 216, respectively. Angle 218 subtended by pixel 210, is the angle between rays 214 and 216, and defines the angular subtense of pixel 210 at vantage point 212. Subtense angle 218 is readily calculated by one skilled in the art for any given pixel size or pitch 220 and distance 224. Pixel 210 may also be tilted with respect to the direction to vantage point 212, and said tilt may vary with the position of pixel 210 within pixeled display 222, but angular pixel subtense 218 is readily calculated.

In a preferred embodiment, angular pixel subtense 218 for normal viewing distance 224 is chosen to have a value that suppresses the visibility of the second and other higher harmonics of the pixel substructure for typical human visual performance. The angular pixel subtense, for example in units of degrees per pixel, can be converted to angular pixel frequency in pixels per degree by taking the reciprocal of the angular pixel subtense. The angular frequency range at which viewer 54, 211 loses the ability to perceive modulation, as indicated by illustrative curve 82 in FIG. 4, is known to vary with the individual viewer, although for many viewers this is known to happen in the range of 30 to 50 cycles per degree. As the first harmonic of the pixel substructure corresponds to one cycle per pixel, and the second harmonic corresponds to two cycles per pixel, the visibility of the second harmonic (and other higher harmonics as well) is suppressed by maintaining an angular pixel subtense that places the second harmonic preferably above 30 cycles per degree, and more preferably above 50 cycles per degree. This corresponds to preferable angular pixel subtense 218 of about 4 minutes of arc or less (i.e., second harmonic greater than 30 cycles per degree), conveniently about 3 minutes of arc or less, and more preferably about 2.4 minutes of arc or less (i.e., second harmonic greater than 50 cycles per degree) to effectively suppress the higher harmonics (second harmonic and above) of the pixel substructure. Stated alternatively, it is convenient that the angular pixel subtense be in the range of 3 to 4 minutes or arc, desirably in the range of 2.4 to 3 minutes or arc and preferably less than about 2.4 minutes of arc. Also shown in FIG. 9A is viewer 225 at second vantage point 226, located at distance 234 from distributed aperture pixel 210. For observer 225 at location 226, the viewing geometry yields angular pixel subtense 232 between rays 228, 230 that is significantly larger than preferred subtense angle 218. Thus, the image quality at vantage point 226 will ordinarily be degraded compared to the image quality at vantage point 212, since higher order harmonics may be visible at vantage point 226 while substantially invisible at vantage point 212.

FIG. 9B shows a simplified schematic side view of optical system 202 according to a further embodiment of the present invention wherein higher order harmonics are suppressed and degraded image quality is avoided. Optical system 202 of FIG. 9B includes simplified lens 250, analogous to simplified lens 52 in FIG. 8. Lens 250 is introduced between distributed aperture pixel 210 and vantage points 262 and 276 of viewer 261. Lens 250 is situated at point 256 at distance 254 away from pixel 210, and preferably has a focal length approximately equal to distance 254 in order to substantially collimate the view of display 222. Lens 250 can take many alternate forms as described above in connection with lens 52 of FIG. 8. Angular subtense 252 of pixel 210 is determined by the relationship of pixel size or pitch 220 and distance 254, and is approximately the inverse tangent of the ratio of pitch 220 to distance 254. For a substantially collimated system, subtense angles 268 and 282 at vantage points 262 and 276 respectively, are both substantially equal to angle 252. The use of lens 250 thereby serves as an angular subtense limiting means and suppresses the visibility of the higher harmonics regardless of the position of the viewer.

It is preferred, therefore, that lens 250 limit the angular pixel subtense, or angle that pixel 30, 210 subtends to viewer 54, 261 to about 4 minutes of arc or less, which places the second harmonic frequency of the fixed pattern noise for the display configuration of, for example FIG. 2C, at greater than 30 cycles per degree. More preferably, to suppress the perceived second harmonic component for a larger percentage of viewers, the angular pixel subtense is desirably about 3 minutes of arc or less and preferably about 2.4 minutes of arc or less, where the latter corresponds to a second harmonic frequency greater than 50 cycles per degree. Stated alternatively, it is convenient that the angular pixel subtense be in the range of 3 to 4 minutes or arc, desirably in the range of 2.4 to 3 minutes or arc and preferably less than about 2.4 minutes of arc. For an embodiment such as this, which includes a collimating lens that limits both the maximum and minimum pixel angular subtense, it is advantageous if the first harmonic is kept low enough to allow the many benefits of the present invention without excessive display resolution requirements, with the first harmonic at or below the perception limit of angular spatial frequencies, for example in the range of 30 to 50 cycles per degree or lower.

Figure 10A:
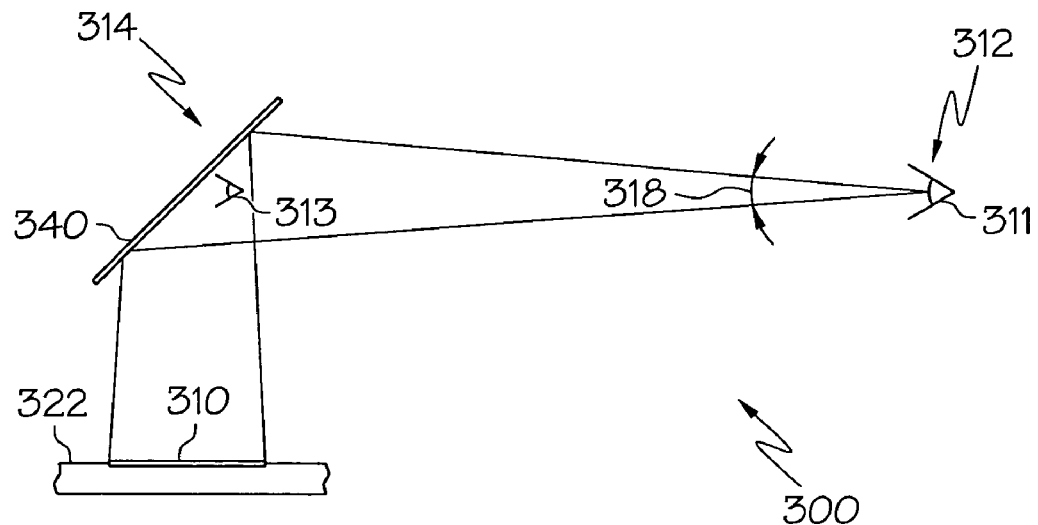
FIGS. 10A-D show simplified schematic side views of an optical display system according to still additional embodiments of the present invention illustrating control of the visibility of higher harmonics by limiting angular pixel subtense.
Figure 10B:
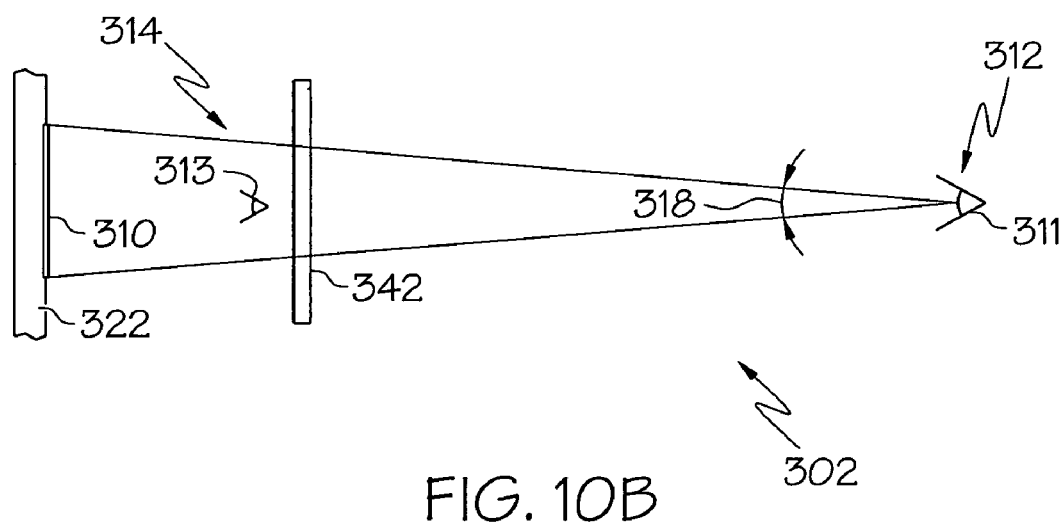
Figure 10C:
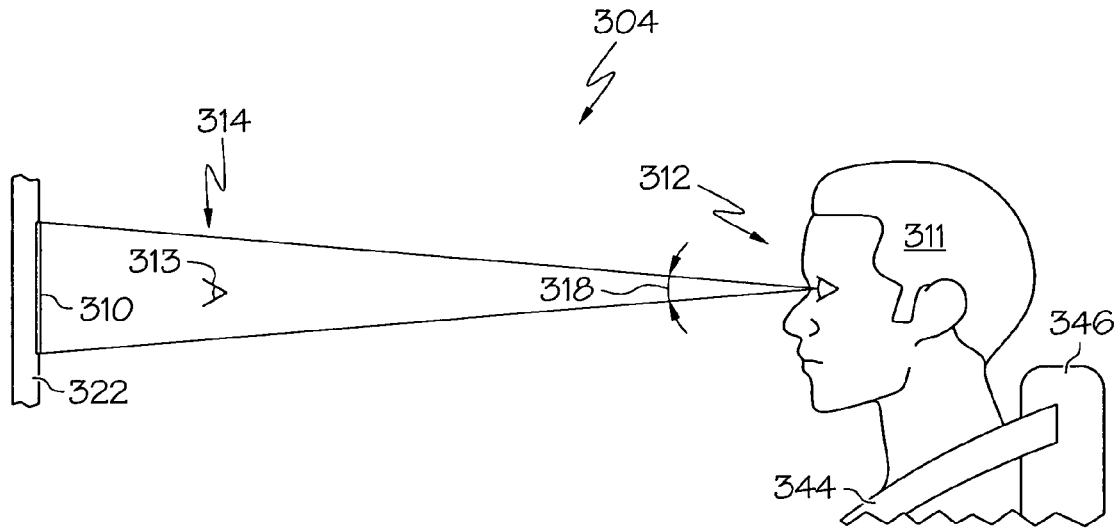

Other pixel angular subtense limiting means for suppressing the higher harmonics of the pixel substructure are shown in FIGS. 10A-D. FIGS. 10A-D show simplified schematic side views of optical display systems 300, 302, 304, 306 according to additional embodiments of the present invention. FIG. 10A shows optical display system 300 having distributed aperture pixel 310 analogous to pixel 30, 210 of FIGS. 8-9A-B, being observed in reflection via reflector 340, for example a mirror or combiner, by observer 311 at vantage point 312 with angular pixel subtense 318. Observer location 314 is not accessible due to physical obstruction by reflector 340, thereby limiting the maximum angular subtense of pixel 310. In optical display system 302 of FIG. 10B, physical barrier 342, such as a window or other impediment to motion, is used to maintain the desired separation between observer 311 and pixel 310. Angular pixel subtense 318 is limited because observer 311 cannot approach closer than barrier 342. Thus, viewing from vantage point 314 or closer is precluded. In optical display system 304 of FIG. 10C, restraint 344 is shown. Restraint 344 is, for example, a seat belt, shoulder harness or other device that limits the movement and position of the viewer 311 with respect to pixel 310 and seat 346. Viewing from vantage point 314 is therefore also precluded in system 304 and angle 318 is limited.

Figure 10D:
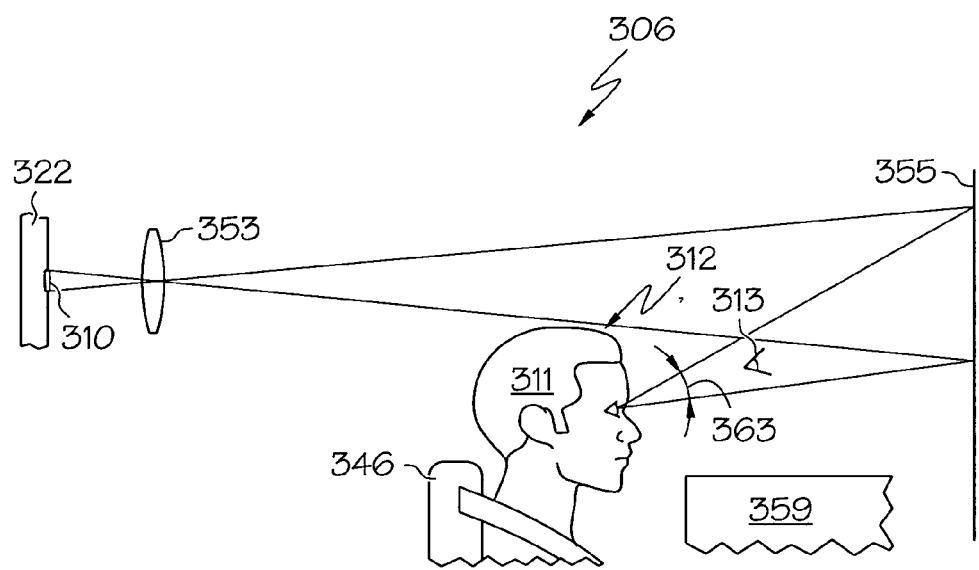

Optical display system 306 of FIG. 10D shows a further embodiment where the visibility of the higher harmonics is suppressed by limiting the angular subtense of pixel 310 being viewed by observer 311 at location 312. Distributed aperture pixel 310, as a part of pixeled display 322, is projected by optics 353 onto viewing screen 355. Angular pixel subtense 363 is limited by the presence of barrier 359 that prevents viewer 311 from reaching position 313. The embodiments of FIGS. 8, 9B, and 10A-D constrain the angular pixel subtense to be within the preferred ranges, that is, about 4 minutes of arc or less, conveniently 3 minutes of arc or less and more preferably about 2.4 minutes of arc or less. Stated alternatively, it is convenient that the angular pixel subtense be in the range of 3 to 4 minutes or arc, desirably in the range of 2.4 to 3 minutes or arc and preferably less than about 2.4 minutes of arc. This places the higher harmonics (second and above) near or beyond the perception threshold of the viewer while the visibility of the first harmonic is suppressed by the distributed aperture pixel topology. The combination of the distributed aperture pixels with an optical display system that limits the pixel angular subtense is a particular feature of the present invention. This combination advantageously controls the spatial harmonics of the overall display and thereby improves overall display quality.

Figure 11A:
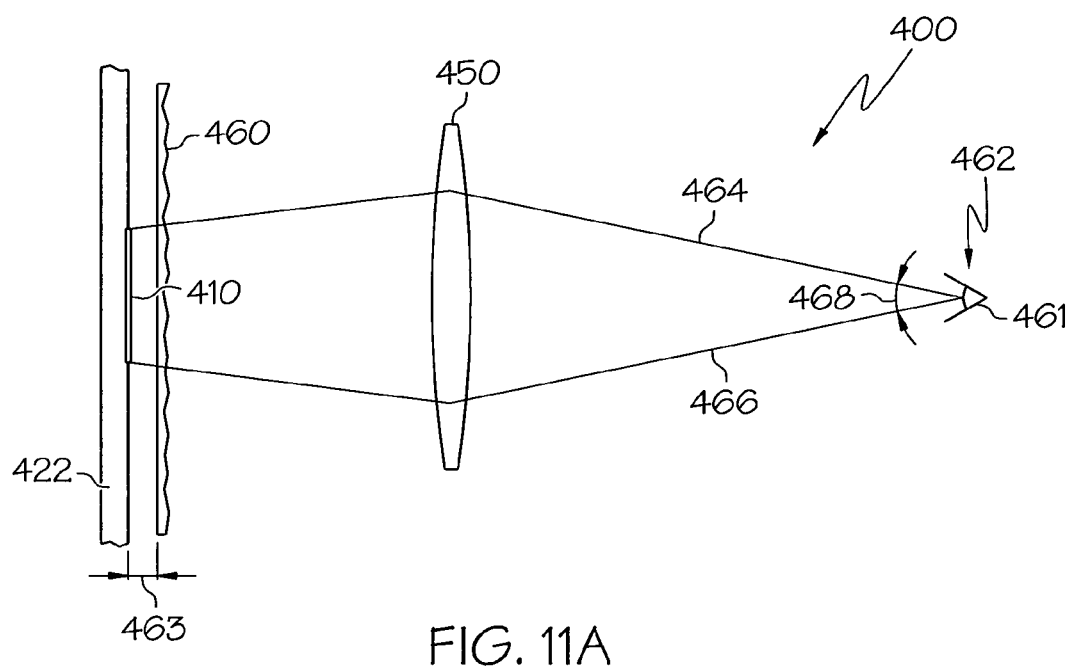
FIGS. 11A-B show simplified schematic side views analogous to those of FIGS. 10A-D of an optical display system according to further additional embodiments of the present invention.
Figure 11B:
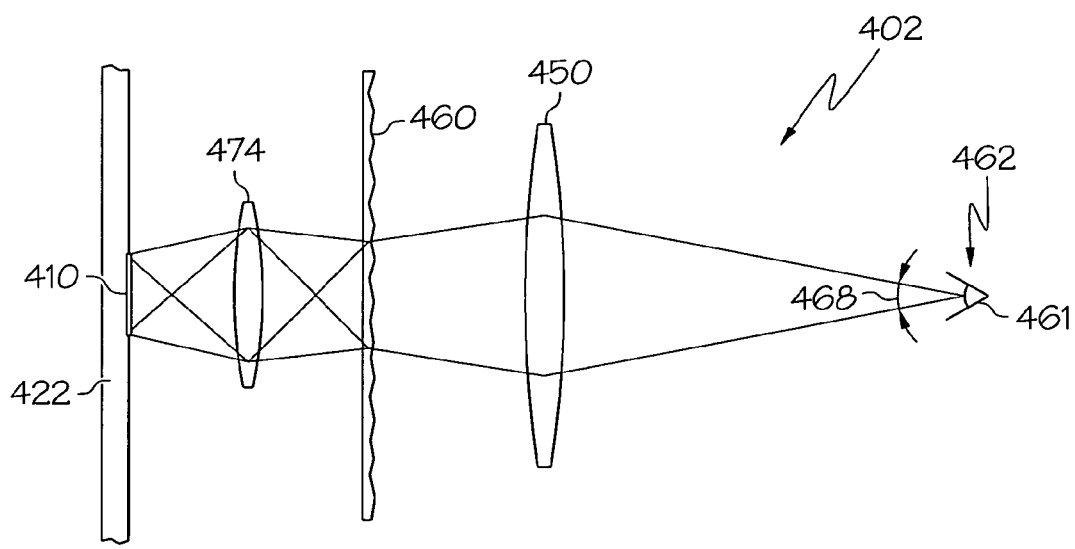

FIGS. 11A-B depict further display system embodiments for suppressing the higher order harmonics of the pixel substructure. FIGS. 11A-B show simplified side views analogous to those of FIGS. 10A-D of optical display systems 400, 402 according to additional embodiments of the present invention. In optical display system 400 of FIG. 11A, viewer 461 at location 462 views distributed aperture pixel 410 (analogous to pixels 30, 210, 310 of FIGS. 8-10D) in pixeled display 422 with angular pixel subtense 468 between rays 464, 466. Collimating optics 450 are preferably included but are not essential in this embodiment. Diffuser or diffusion layer 460 serves in this embodiment to filter or suppress the higher harmonics (second and above) of the pixel structure by optically blurring the fine features, while leaving the desired image modulation substantially un-blurred. The highest spatial frequency in the desired image modulation has a period of two pixels as described in the context of FIG. 2E (to allow a full ON-OFF cycle), and is therefore at half the spatial frequency of the first harmonic. By using one or the other of the distributed aperture arrangements illustrated in FIGS. 2-5 to suppress the first harmonic, the requirements are relaxed for diffuse layer or diffuser 460. This allows a less diffuse layer to be used to filter or suppress the higher harmonics while preserving the desired image components that fall below the first harmonic of the pixel structure. Tuning of the effective filtration can be adjusted by varying separation 463 between pixeled display 422 and diffuse layer 460, if desired.

Optical display system 402 of FIG. 11B includes additional means for suppression of the higher harmonics. Distributed aperture pixel 410 of pixeled display 422 is imaged by projection lens 474 onto diffuser or diffusion layer 460 which serves as a projection screen in this embodiment. In addition to any diffusion inherent in the screen, layer 460 also serves to mix any rays not imaged perfectly by projection lens 474, for example due to aberrations or defocus. Projection lens 474 and diffuser or diffusion layer 460 function together in this embodiment as a means to suppress the higher harmonics while preserving the image components that fall below the first harmonic of the pixel structure. Collimating optics 450 are optional in this embodiment as well.

The foregoing embodiments provide for suppression of both the first and higher order harmonics and have particular relevance when there are multiple individual constituent colors in a head-up display (HUD) or other collimated display. An exemplary embodiment utilizes the multi-color pixels of FIGS. 5J-L in collimated HUD embodiment 50, 200, 202, 300, 302, 304, 306, 400 and 402 of FIGS. 8-11B. These configurations overcome certain undesirable consequences of conventional approaches arising, for example, from the magnification often associated with collimating optics and/or the challenges associated with shrinking the size of the color pixel.

While at least one exemplary embodiment has been presented in the foregoing detailed description, it should be appreciated that a vast number of variations exist. In particular, the size and shape and distribution of the various switched (luminous) regions in the pixels of the present invention may be varied provided that there are, in at least one direction across the pixel array, two or more regions in some or all of the pixels that switch or illuminate together. Stated alternatively, the present invention comprises pixel structures in which, in at least one direction across the pixel array, the first harmonic spatial frequency of the display is near or below the threshold of detection as a result of providing more than one simultaneously switched portion within at least some of the individual pixels viewed along the at least one direction for which the spatial frequency is determined. The present invention further provides means for suppressing the higher harmonics of the display pixels, either by limiting the angular pixel subtense available to the viewer or by optical filtering of the higher harmonics before presenting them to the viewer. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A matrix display system, comprising:
   an array of pixels each having a pixel substructure and a first pixel pitch along a first direction for displaying an image in response to input signals to the pixels, wherein the pixels have switchable regions adapted to be activated by the input signals, each switchable region having a corresponding color, each of the switchable regions of a same first color being simultaneously switched and electrically coupled in parallel, the switchable regions of said first color having portions spatially distributed within the pixel according to a first spatial pattern with regions that are non-switchable or only switchable for a different color interspersed, and configured to display a grayscale image with a plurality of drive levels, each visible gray level for said first color being displayed according to the same said first spatial pattern for said first color; and
   angular pixel control means optically located between the array of pixels and a viewer for collecting light from the array of pixels and presenting the light to the viewer, wherein the angular pixel control means limits the range of angular pixel size associated with said first pixel pitch as seen by the viewer, such that said pixel substructure for said first color along said first direction would be substantially invisible to an average human observer.

2. The display system of claim 1, wherein the angular pixel control means comprises an optical angular pixel control means for relaying and collimating an image presented by the display.

3. The display of claim 1, wherein the angular pixel control means limits the angular pixel size as seen by the viewer to about 4 minutes of arc or less.

4. The display of claim 1, wherein the angular pixel control means limits the angular pixel size as seen by the viewer to about 3 minutes of arc or less.

5. The display of claim 1 wherein the angular pixel control means limits the angular pixel size as seen by the viewer to about 2.4 minutes of arc or less.

6. The display system of claim 1, wherein the matrix display is a color display, and wherein each pixel comprises a first sub-pixel having a first chromaticity and a second sub-pixel having a second chromaticity, wherein at least one of the first and second sub-pixels is distributed in the pixel area with intervening inactive aperture regions.

7. The display system of claim 6, wherein each pixel further comprises a third sub-pixel having a third chromaticity.

8. The matrix display system of claim 1, wherein the plurality of drive levels comprise a full on drive level, a full off drive level, and an intermediate drive level between the full on and full off drive levels.

9. The matrix display system of claim 1, wherein the angular pixel control means comprises a barrier providing separation between the viewer and the array of pixels.

10. The matrix display system of claim 1, wherein the angular pixel control means comprises a restraint that limits movement, position, or both, of the viewer.

11. The matrix display system of claim 1, wherein each of the pixels of the array of pixels are substantially identical to one another.

12. The matrix display system of claim 1, wherein each of the pixels of the array of pixels are identical to one another.

13. The matrix display system of claim 1, wherein the matrix display system provides a monochrome display with a single color.

14. A display system, comprising:
an array of rows and columns of pixels each having a pixel substructure and a first pixel pitch along a first direction and having an aperture ratio and more than one switchable area per pixel and adapted to emit light exhibiting at least a zero-order spatial frequency component and first harmonic spatial frequency components, wherein the first harmonic spatial frequency components have a magnitude less than that from an array of pixels having the same aperture ratio but only a single switchable area per pixel, wherein each switchable area for a particular pixel has a corresponding color, the switchable areas of a same first color being simultaneously switched with one another and electrically coupled in parallel to one another, spatially distributed within the pixel according to a first spatial pattern with regions that are non-switchable or only switchable for a different color, and configured to display a grayscale image with a plurality of drive levels, each visible gray level for said first color being displayed according to the same said first spatial pattern for said first color; and
angular pixel control means optically located between the array of pixels and the viewer for collecting light from the pixels and presenting the light to a viewer, wherein the angular pixel control means limits the range of angular spatial frequencies associated with said first pixel pitch as seen by the viewer which the first harmonic spatial frequency components can present to the viewer such that said pixel substructure for said first color along said first direction would be substantially invisible to an average human observer.

15. The display system of claim 14, wherein the first harmonic components have magnitudes that are less than 80% of the magnitudes of first harmonic components for an equivalent aperture ratio square pixel having substantially the same zero-order spatial frequency component.

16. A display system comprising:
a matrix display for generating an image, comprising an array of pixels, each of said pixels each having a pixel substructure and a first pixel pitch along a first direction and having an active pixel aperture significantly distributed in the pixel area spatially distributed within the pixel according to a first spatial pattern with non-active regions of the pixel interspersed within or between active regions of the pixel, wherein the active pixel aperture of each pixel comprises a plurality of areas each having a color, with each area of a same first color being simultaneously turned on and off together and electrically coupled in parallel together, and configured to display a grayscale image with a plurality of drive levels, each visible gray level for said first color being displayed according to the same said first spatial pattern for said first color; and
optics for collimating the image from the matrix display to limit the angular pixel size associated with said first pixel pitch as seen by a viewer so that second and higher spatial harmonics of the display are substantially invisible to an average human observer.

17. A system for displaying an image to a viewer, comprising:
a display panel for forming the image using an array of pixels with distributed active regions suppressing or reducing first harmonic spatial frequencies of the display panel compared to an equivalent panel without distributed active regions in the pixels, wherein each pixel has a pixel substructure and a first pixel pitch along a first direction, and wherein the active regions of each pixel comprise a plurality of areas each having a color, with each area of a same first color being switched together with one another and electrically coupled in parallel to one another and spatially distributed within the pixel according to a first spatial pattern with regions that are non-switchable or only switchable for a different color; and
an optical viewing arrangement proximate the display panel for transferring the image formed on the display panel to a viewer via spatial harmonic suppression means adapted to reduce visibility of the second and higher harmonic spatial frequencies of the display panel associated with said first pixel pitch as seen by the viewer compared to a viewing arrangement without such spatial harmonic suppression means, such that said pixel substructure for said first color along said first direction would be substantially invisible to an average human observer, wherein the optical viewing arrangement comprises a restraint that limits movement, position, or both, of the viewer.

18. The system of claim 17 wherein the spatial harmonic suppression means comprises collimating optics.

19. The system of claim 17 wherein the spatial harmonic suppression means comprises diffusion means located between the display panel and the viewer.

20. The system of claim 17, wherein the restraint limits the movement of the viewer with respect to the array of pixels.

* * * * *